(12) United States Patent
Hirashima et al.

(10) Patent No.: US 9,799,371 B1
(45) Date of Patent: Oct. 24, 2017

(54) TAPE APPARATUS AND CONTROL DEVICE

(71) Applicant: FUJITSU LIMITED, Kawasaki-shi, Kanagawa (JP)

(72) Inventors: Nobuyuki Hirashima, Nagano (JP); Takashi Murayama, Nagano (JP); Takuya Kurihara, Nagano (JP); Takaaki Yamato, Nagano (JP); Katsuo Enohara, Kawaguchi (JP); Naoki Hirabayashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/499,015

(22) Filed: Apr. 27, 2017

(30) Foreign Application Priority Data

May 11, 2016 (JP) .................................. 2016-095187

(51) Int. Cl.
*G11B 20/18* (2006.01)
*G11B 5/008* (2006.01)
*G11B 5/09* (2006.01)
*G11B 20/12* (2006.01)

(52) U.S. Cl.
CPC ...... *G11B 20/1886* (2013.01); *G11B 5/00821* (2013.01); *G11B 5/09* (2013.01); *G11B 20/1202* (2013.01); *G11B 2020/183* (2013.01); *G11B 2020/1893* (2013.01)

(58) Field of Classification Search
CPC ... G11B 5/008; G11B 5/00813–5/0083; G11B 5/02; G11B 5/09; G11B 20/1201–20/1205; G11B 20/18–20/1803; G11B 20/1886; G11B 2020/183–2020/1893

USPC .................. 360/31, 48, 53, 55, 69, 71, 78.02
See application file for complete search history.

(56) References Cited

U.S. PATENT DOCUMENTS

| 5,251,077 A * | 10/1993 | Saitoh | G11B 20/18 360/53 |
| 7,085,086 B2 * | 8/2006 | Kimura | G11B 20/1883 360/31 |
| 7,440,212 B2 * | 10/2008 | Saliba | G11B 20/1202 360/53 |

(Continued)

FOREIGN PATENT DOCUMENTS

| JP | 8-45182 | 2/1996 |
| JP | 2006-164445 | 6/2006 |
| JP | 2012-506599 | 3/2012 |

*Primary Examiner* — Wayne Young
*Assistant Examiner* — James L Habermehl
(74) *Attorney, Agent, or Firm* — Staas & Halsey LLP

(57) ABSTRACT

A tape apparatus includes a tape drive and a processor. The tape drive is configured to perform data reading and data writing on a magnetic tape in which a plurality of tracks are formed. The processor is configured to control the tape drive to perform data reading and data writing on the plurality of tracks in a first segment among a plurality of segments obtained by dividing the magnetic tape in a running direction. The processor is configured to reserve a first track of the plurality of tracks as a copy target upon determining that an abnormality occurs in the first segment on the first track. The processor is configured to instruct the tape drive to copy data recorded in the first segment on the first track to a second segment on the first track at a predetermined timing. The second segment is adjacent to the first segment.

12 Claims, 21 Drawing Sheets

(56) References Cited

U.S. PATENT DOCUMENTS

| | | | |
|---|---|---|---|
| 7,852,600 B2* | 12/2010 | Masuda | G11B 5/584 |
| | | | 360/77.12 |
| 7,978,427 B2* | 7/2011 | Kobayashi | G06F 21/10 |
| | | | 360/18 |
| 8,037,346 B2* | 10/2011 | Katagiri | G11B 20/1201 |
| | | | 714/6.13 |
| 8,276,044 B2* | 9/2012 | Masuda | G11B 20/1833 |
| | | | 714/771 |
| 8,397,136 B2* | 3/2013 | Masuda | G11B 20/1833 |
| | | | 714/763 |
| 9,081,506 B2* | 7/2015 | Ochi | G11B 5/00813 |
| 2006/0126211 A1 | 6/2006 | Sasaki | |
| 2008/0266699 A1* | 10/2008 | Masuda | G11B 5/584 |
| | | | 360/69 |
| 2011/0199703 A1 | 8/2011 | Hansen et al. | |

* cited by examiner

FIG. 12

| MEDIUM SPECIFICATION TABLE | | | |
|---|---|---|---|
| GENERATION | DATA CAPACITY | NUMBER OF TRACKS | NUMBER OF WRAPS PER DATA BAND |
| LTO1 | 100 GB | 384 | 12 |
| LTO2 | 200 GB | 512 | 16 |
| LTO3 | 400 GB | 704 | 11 |
| LTO4 | 800 GB | 896 | 14 |
| LTO5 | 1.5 TB | 1280 | 20 |
| LTO6 | 2.5 TB | 2176 | 34 |
| ... | ... | ... | ... |

111a

TAPE APPARATUS AND CONTROL DEVICE

CROSS-REFERENCE TO RELATED APPLICATION

This application is based upon and claims the benefit of priority of the prior Japanese Patent Application No. 2016-095187, filed on May 11, 2016, the entire contents of which are incorporated herein by reference.

FIELD

The embodiments discussed herein are related to a tape apparatus and a control device.

BACKGROUND

Magnetic tapes are known as a large-capacity and low-cost storage medium. Among linear type magnetic tapes, there is a magnetic tape in which a plurality of tracks are formed, and when data is written in a forward direction from the beginning of a certain track and the writing is performed to the end of the track, data is written to another track in a reverse direction. As a standard of a magnetic tape in which such a method is adopted, Linear Tape-Open (LTO) Ultrium has been widely used.

As an example of a technique related to writing to a magnetic tape, a technique has been proposed in which data length from the beginning to a wrap turn position is calculated from a total amount of data to be written on the magnetic tape, data is written in the forward direction to the calculated wrap turn position, and then the remaining data is written in the reverse direction.

In addition, the following technique related to a tape drive has been proposed. For example, a magnetic tape library apparatus determines maintenance or replacement of the tape drive on the basis of the number of retries of data reading or the number of retries of data writing performed on a tape cartridge by the tape drive of its own apparatus.

Related techniques are disclosed in, for example, Japanese Laid-open Patent Publication No. 8-45182 and Japanese Laid-open Patent Publication No. 2006-164445.

In the above-mentioned technique related to writing to the magnetic tape, after data is written to the wrap turn position, the remaining data is written in the reverse direction. When reading the written data, the data is read from the beginning to the wrap turn position. Thereafter, the data is read from the wrap turn position in the reverse direction.

In this way, in the above-mentioned technique, a predetermined area from the beginning to the wrap turn position is repeatedly used for data reading and writing. Accordingly, for example, an abnormality is likely to occur when reading data and, there are many cases in which a read operation may be retried. As a result, the entire time to read data becomes longer.

SUMMARY

According to an aspect of the present invention, provided is a tape apparatus including a tape drive and a processor. The tape drive is configured to perform data reading and data writing on a magnetic tape in which a plurality of tracks are formed. The processor is configured to control the tape drive to perform data reading and data writing on the plurality of tracks in a first segment among a plurality of segments obtained by dividing the magnetic tape in a running direction. The processor is configured to reserve a first track of the plurality of tracks as a copy target upon determining that an abnormality occurs in the first segment on the first track. The processor is configured to instruct the tape drive to copy data recorded in the first segment on the first track to a second segment on the first track at a predetermined timing. The second segment is one of the plurality of segments and adjacent to the first segment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating an example of a medium specification table;

DESCRIPTION OF EMBODIMENTS

Hereinafter, embodiments will be described with reference to the drawings.

First Embodiment

Figure 1:
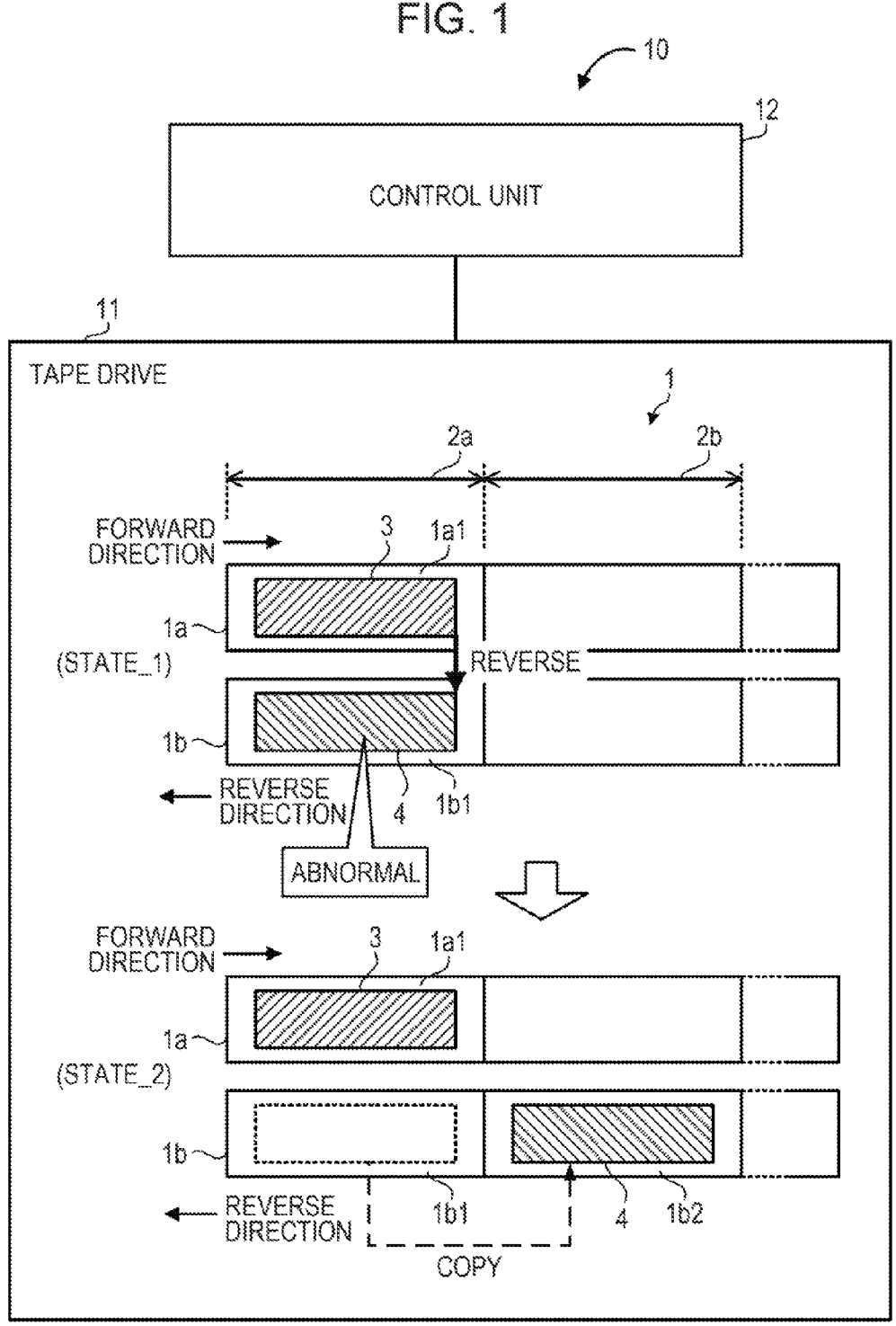
FIG. 1 is a diagram illustrating a tape apparatus according to a first embodiment.

FIG. 1 is a diagram illustrating a tape apparatus according to a first embodiment. A tape apparatus 10 includes a tape drive 11 and a control unit 12.

In the tape drive 11, a magnetic tape 1 is stored. The tape drive 11 performs data writing or data reading on the magnetic tape 1 under the control of the control unit 12. In the magnetic tape 1, a plurality of tracks are formed. The plurality of tracks include a track in which read and write directions are in a forward direction and a track in which read and write directions are in a reverse direction.

The tape drive 11 performs data writing while reciprocating a magnetic head over the magnetic tape 1 such that data is written to a certain track in a forward direction, data is written to the next track in the reverse direction, and data is written to the next track in the forward direction. The tape drive 11 performs data reading while reciprocating the magnetic head over the magnetic tape 1 such that the data recorded in a certain track is read in a forward direction, and the data recorded in the next track is read in the reverse direction by reversing the read direction at the end of a data area.

The control unit 12 is, for example, a processor. The processor may include a central processing unit (CPU), a digital signal processor (DSP), an application specific integrated circuit (ASIC), and a field programmable gate array (FPGA), or the like. The "processor" may include a collection of a plurality of processors (multi-processor).

The control unit 12 sets a plurality of segments obtained by dividing the magnetic tape 1 in its running direction. In the example of FIG. 1, segments 2a and 2b are set sequentially from the beginning side of the magnetic tape 1. Each segment has the same length for example.

The control unit 12 controls the tape drive 11 so as to read and write data using the segment 2a. The tape drive 11 reads and writes data by reciprocating the magnetic head over the segment 2a. For example, as in the STATE_1 of FIG. 1, the tape drive 11 writes data 3 in a forward direction to an area 1a1 included in the segment 2a in the area of a track 1a. When a predetermined condition for terminating the writing to the area 1a1 is satisfied, the tape drive 11 reverses the write direction to write the subsequent data 4 to an area 1b1 included in the segment 2a in the area of a track 1b.

In this way, data is written in only one segment 2a. Thus, for example, in a case where the amount of data to be recorded on the magnetic tape 1 is smaller than the maximum capacity of the magnetic tape 1, it is possible to reduce the time to read the data. This is because the positioning amount of the magnetic head for reading the data becomes smaller than a case where data is written to the entire magnetic tape 1, and it is possible to start data reading in a short period of time.

The control unit 12 monitors whether or not an abnormality occurs in each track within the segment 2a. For example, in a case where the number (read retry count) of retries of data reading, the number (write retry count) of retries of data writing, or the total of the read retry count and the write retry count in each track exceeds a predetermined threshold, it is determined that an abnormality has occurred.

For example, when the control unit 12 determines that an abnormality has occurred in the area 1b1 of the track 1b, the control unit 12 reserves the track 1b as a copy target. Then, the control unit 12 instructs the tape drive 11 to copy the data 4 recorded in the area 1b1 of the reserved track 1b to an area 1b2 included in the segment 2b adjacent to the segment 2a in the area of the same track 1b at a predetermined timing.

In this way, as in the STATE_2 of FIG. 1, the tape drive 11 copies the data 4 recorded in the area 1b1 to the area 1b2.

Note that, it is preferable that copying the data 4 from the area 1b1 to the area 1b2 is performed during a period when reading and writing of magnetic tape 1 is not performed, in order not to affect the read and write performance. For example, when the control unit 12 receives an instruction to unmount the magnetic tape 1 from a host apparatus (not illustrated) or the like, copying the data 4 is performed before the unmount is performed.

As in the STATE_1, when data reading and writing is performed using the segment 2a only, the magnetic head repeatedly reciprocates on the segment 2a only, and therefore the segment 2a is overworked. For this reason, probability of occurrence of an error when writing and reading in the tracks within the segment 2a increases, and the write or read retry count is increased accordingly.

For example, the more the read retry count in the area 1b1 of the track 1b is, the longer the time to read data from the area 1b1. On the other hand, according to the first embodiment, when it is determined that an abnormality has occurred in the area 1b1, the data 4 that has been recorded in the area 1b1 is copied from the area 1b1 to the area 1b2. In the area 1b2, since the read or write retry count is less than that in the area 1b1, the probability that a retry of data reading occurs is lower compared to the area 1b1. Therefore, it is possible to suppress an increase in time desired for data reading by reading the data 4 from the area 1b2 instead of the area 1b1.

Second Embodiment

Figure 2:
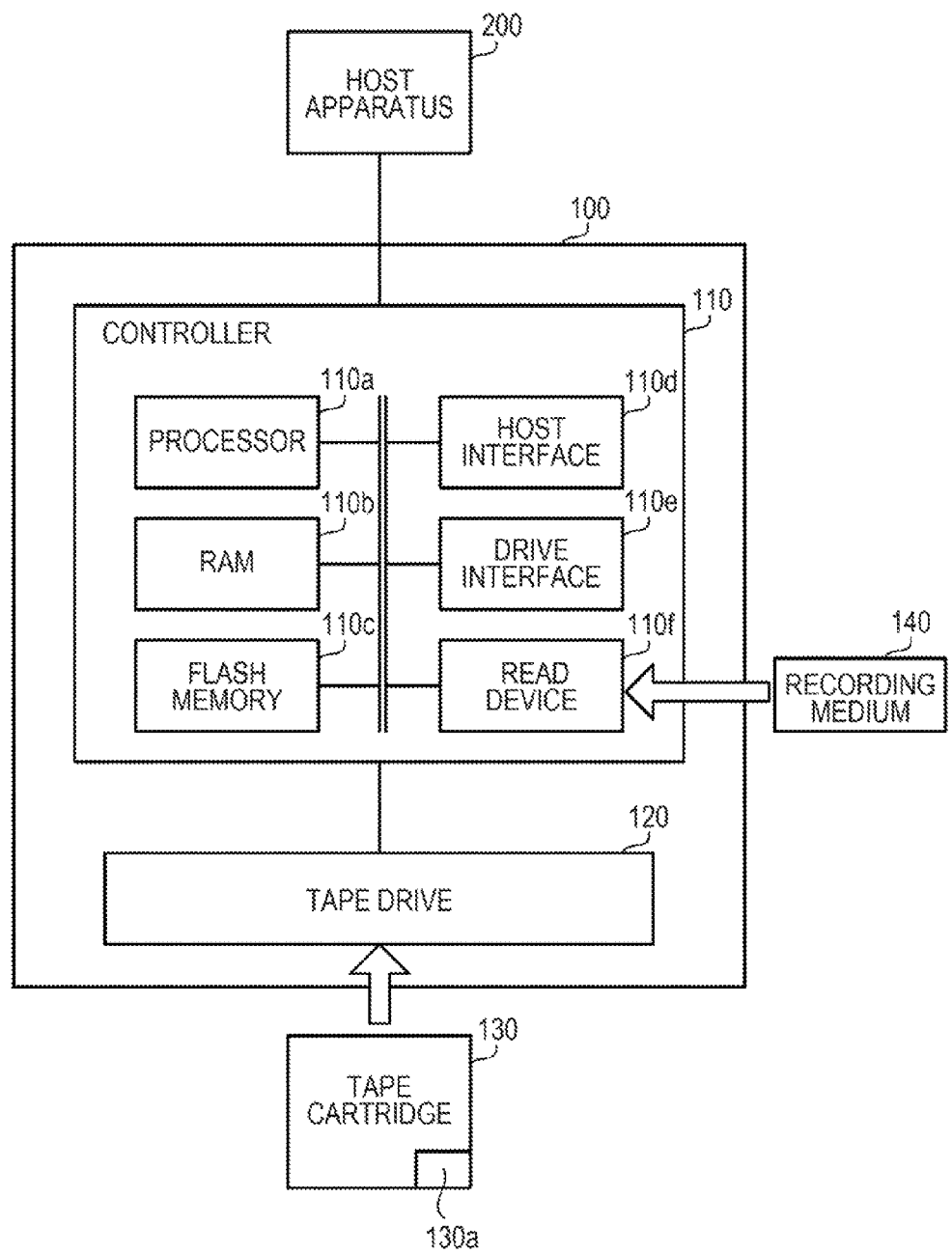
FIG. 2 is a diagram illustrating an exemplary hardware configuration of a tape apparatus according to a second embodiment.

FIG. 2 is a diagram illustrating an exemplary hardware configuration of a tape apparatus according to a second embodiment. A tape apparatus 100 includes a controller 110 and a tape drive 120. The tape apparatus 100 may include a plurality of tape drives.

The controller 110 controls a data access to a tape cartridge 130 stored in the tape drive 120 in accordance with a request received from a host apparatus 200, and operations of hardware modules within the tape apparatus 100, or the like.

The controller 110 includes a processor 110a, a random access memory (RAM) 110b, a flash memory 110c, a host interface 110d, a drive interface 110e, and a read device 110f.

The processor 110a centrally controls the entire controller 110. The processor 110a is, for example, a CPU, a DSP, an ASIC, an FPGA, or the like. The processor 110a may be a multi-processor. The processor 110a may be a combination of two or more elements of, such as a CPU, a DSP, an ASIC, an FPGA, or the like.

The RAM 110b is a main storage device of the tape apparatus 100. The RAM 110b temporarily stores therein at least a portion of an operating system (OS) program or an application program to be executed by the processor 110a. In addition, the RAM 110b stores therein various kinds of data to be used in the process performed by the processor 110a.

The flash memory 110c is an auxiliary storage device of the tape apparatus 100. Application programs and various kinds of data are stored in the flash memory 110c. The host interface 110d is an interface configured to communicate with the host apparatus 200. The drive interface 110e is an interface configured to communicate with the tape drive 120.

The read device 110f is a device configured to read programs or data recorded in a portable recording medium 140. As the recording medium 140, for example, a magnetic disk such as a flexible disk (FD) or a hard disk drive (HDD), an optical disk such as a compact disc (CD) and a digital versatile disc (DVD), or a magneto-optical disk (MO) may be used. In addition, as the recording medium 140, for example, non-volatile semiconductor memory such as a flash memory card or the like may be used. The read device 110f, for example, stores a program or data read from the recording medium 140 to the RAM 110b or the flash memory 110c in accordance with a command received from the processor 110a.

In the tape drive 120, the tape cartridge 130 storing a magnetic tape is inserted or removed. The tape cartridge 130 includes a cartridge memory 130a. In the cartridge memory 130a, various information about the tape cartridge 130 is stored. The tape drive 120 mounts the tape cartridge 130, and performs data writing or data reading on the magnetic tape within the mounted tape cartridge 130 under the control of the controller 110. In addition, the tape drive 120 may perform data writing or data reading on the cartridge memory 130a of the mounted tape cartridge 130. For example, when the tape cartridge 130 is requested to be unmounted, the tape drive 120 records the remaining capacity of the magnetic tape in the cartridge memory 130a, and then unmounts the tape cartridge 130.

Figure 3:
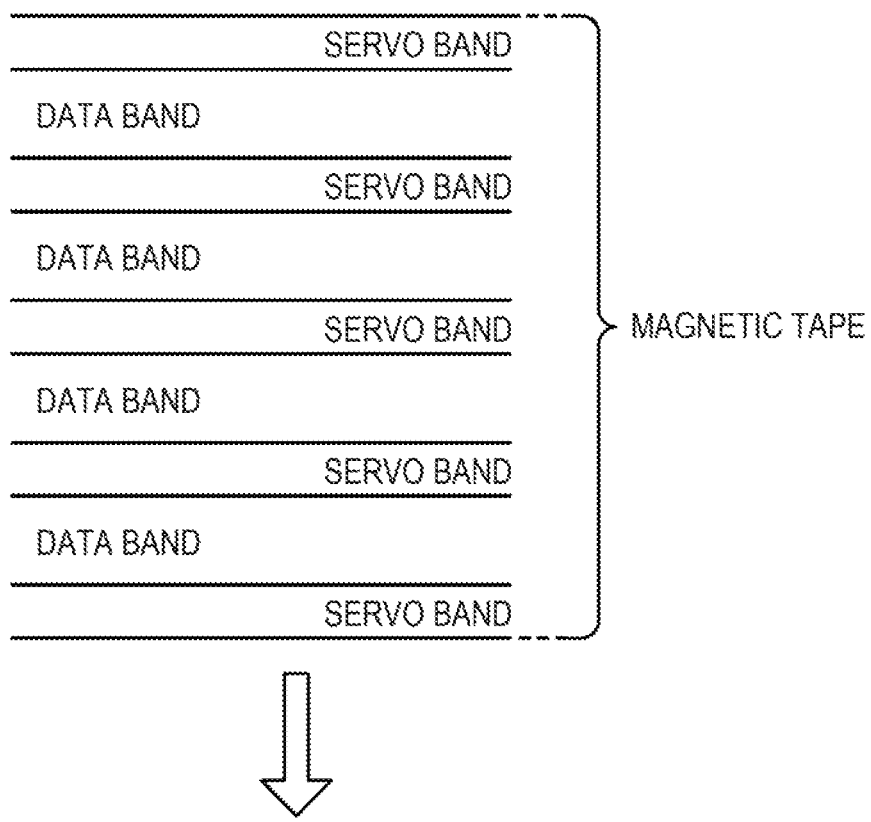
FIG. 3 is a diagram illustrating an example of magnetic tape.

FIG. 3 is a diagram illustrating an example of a magnetic tape. In the present embodiment, a magnetic tape of the LTO Ultrium standard is used as an example. The magnetic tape of the LTO Ultrium standard includes 5 servo bands and 4 data bands. Each data band includes a plurality of tracks. In the case of LTO Ultrium 6, a magnetic tape includes a total of 2,176 tracks (544 tracks per data band).

In the LTO Ultrium standard, reading and writing are performed in both forward and reverse directions. In the LTO Ultrium standard, a plurality of tracks within the data band are read and written concurrently. For example, in the case of LTO Ultrium 6, 16 tracks in one data band are written concurrently, and the magnetic head reciprocates for 17 times. Therefore, a total of 544 (16×2×17) tracks are written in one data band. Here, a group of a plurality of tracks to be read and written concurrently is called a "WRAP". In the case of LTO Ultrium 6, one WRAP consists of 16 tracks.

Figure 4:
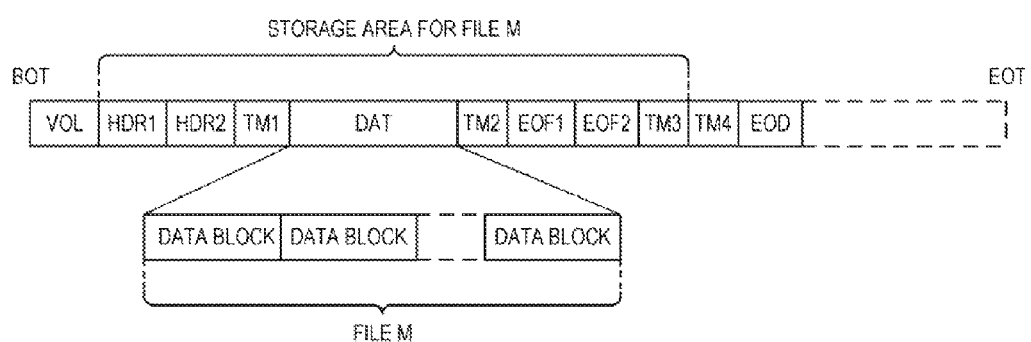
FIG. 4 is a diagram illustrating a data format of a magnetic tape.

FIG. 4 is a diagram illustrating a data format of a magnetic tape. This FIG. 4 illustrates a data format in the storage area of the entire magnetic tape. Beginning of tape (BOT) means the beginning of the magnetic tape, and end of tape (EOT) means the end of the magnetic tape. In practice, a label indicating the BOT is recorded at the very beginning position of the magnetic tape, and a label indicating the EOT is recorded at the very end position of the magnetic tape, but in FIG. 4, these labels are omitted.

At the beginning of the magnetic tape, a "Volume" (VOL) is recorded. The VOL is a label in which, for example, information as a heading of what kind of information is registered in the magnetic tape is recorded. FIG. 4 illustrates an example in which a file M is written after the VOL. In front of the "Data" (DAT) which is a storage area of the actual data of the file M, a "Header" (HDR) 1, an HDR2, and a "Tape Mark" (TM) are recorded. In order to make the description easy to understand, the TM to be recorded after the HDR2 is referred to as TM1. In addition, after the DAT, a TM, an "End Of File" (EOF) 1, an EOF2, and a TM are recorded. In order to make the description easy to understand, the TM to be recorded after the DAT is referred to as TM2, and the TM to be recorded after the EOF2 is referred to as TM3.

The HDR1 and the HDR2 are labels indicating a heading of the file. The TM1 is a marker indicating the start of the actual data. In the DAT, the actual data of the file M is written while being divided into data blocks of a fixed size. The TM2 is a marker indicating the end of the actual data. The EOF1 and the EOF2 are labels indicating the end of the file. The TM3 is a marker indicating the end of the file. That is, the area from the HDR1 to the TM3 is a storage area corresponding to the one file M.

In a case where writing is completed without another file being written after the file M, a TM and an "end of data" (EOD) are recorded after the storage area corresponding to the file M. In order to make the description easy to understand, the TM to be recorded after the storage area corresponding to the file M is referred to as TM4. The TM4 is a marker indicating the end of the area where the data is stored. The EOD is a label indicating the end of the area where the data is stored.

Figure 5:
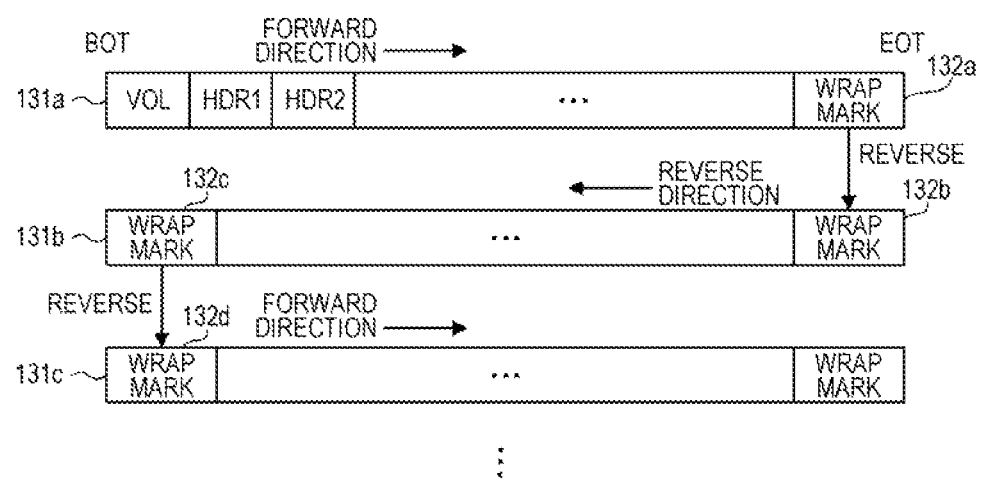
FIG. 5 is a diagram illustrating data writing and reading for each WRAP.

Each label of the BOT, the VOL, the HDR1, the HDR2, the EOF1, and the EOF2 is 80 bytes. The TM1 to the TM4 have the same capacity of less than 10 bytes, respectively. FIG. 5 is a diagram illustrating data writing and reading for each WRAP. Note that, although not illustrated in the diagram, a label indicating the BOT is recorded in advance at the beginning of each WRAP, and a label indicating the EOT is recorded in advance at the end of each WRAP. The terms "beginning" and "end" mentioned here refer to a physical start and end of the magnetic tape irrespective of the read and write directions.

In the LTO Ultrium standard, reading and writing are performed in both directions of a forward direction indicating the direction from the BOT to the EOT and the reverse direction indicating the direction from the EOT to the BOT. Accordingly, the WRAPs includes "forward WRAPs" in which reading and writing are performed in the forward direction and "reverse WRAPs" in which reading and writing are performed in a reverse direction. In the example of FIG. 5, a WRAP 131a is a beginning WRAP and a forward WRAP. A WRAP 131b is the second WRAP and a reverse WRAP. A WRAP 131c is the third WRAP and a forward WRAP. That is, odd-numbered WRAPs from the beginning are forward WRAPs and even-numbered WRAPs are reverse WRAPs.

Hereinafter, the beginning and end of a WRAP in read and write directions will be referred to as "WRAP start" and "WRAP end", respectively, which are distinguished from the beginning and end points indicated by BOT and EOT, respectively.

In the WRAP, a marker called a WRAP mark is recorded which indicates that the direction of the WRAP is reversed during performing data reading. For example, in FIG. 5, it is assumed that the tape drive 120 is performing data writing on the WRAP 131a in the forward direction. When a write position reaches a position of a predetermined length from the EOT, the tape drive 120 writes a WRAP mark 132a and reverses the write direction. The tape drive 120 writes a WRAP mark 132b in the next WRAP 131b at the same position as the WRAP mark 132a, and then performs data writing on the WRAP 131b in the reverse direction. When a write position reaches a position of a predetermined length from the BOT, the tape drive 120 writes a WRAP mark 132c and reverses the write direction. The tape drive 120 writes a WRAP mark 132d in the next WRAP 131c at the same position as the WRAP mark 132c, and then performs data writing on the WRAP 131c in the forward direction.

The following operation is performed when performing data reading. For example, in FIG. 5, it is assumed that the tape drive 120 is performing data reading on the WRAP 131a in the forward direction. Upon detecting the WRAP mark 132a, the tape drive 120 reverses the read direction and performs data reading on the WRAP 131b in the reverse direction starting from the position of the WRAP mark 132b. Upon detecting the WRAP mark 132c, the tape drive 120 reverses the read direction and performs data reading on the WRAP 131c in the forward direction starting from the position of the WRAP mark 132d.

Note that, reversing the write or read direction of a WRAP may be referred to as "WRAP reverse" in some cases. As described above, during performing data reading, the WRAP reverse is performed in response to detection of the WRAP mark.

By the way, as examples of a write mode for a magnetic tape, there are two modes of a 128-track mode and a 36-track mode. The 128-track mode is a mode in which the number of writable data blocks is not limited, and data may be written in the entire magnetic tape. On the other hand, the 36-track mode is a mode in which the number of writable data blocks is limited. For example, the maximum number of writable data blocks is 4,000,000. This mode is intended to make the data format compatible with other standards of magnetic tapes such as a cartridge magnetic tape (CMT).

In a case where writing is performed in the 36-track mode on the magnetic tape of the LTO Ultrium standard, the maximum amount of data that is allowed to be written is smaller than the maximum amount of data that may be written in the magnetic tape. For this reason, even if the maximum allowable amount of data is written, an unused area remains in some WRAPs.

Figure 6:
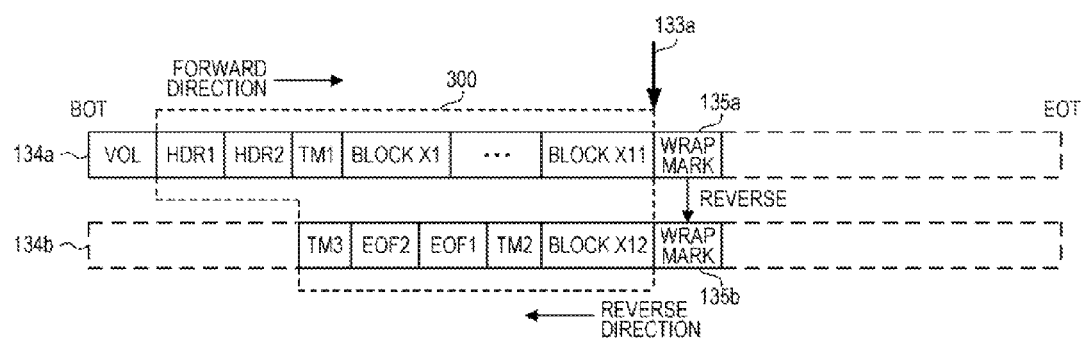
FIG. 6 is a diagram illustrating an example of a first write process in a 36-track mode.

Here, a comparison example in the case of performing a write process in the 36-track mode will be described using FIGS. 6 and 7. FIG. 6 is a diagram illustrating an example of a first write process in the 36-track mode.

As an example of a writing method in the 36-track mode, a method of writing data by using end-to-end WRAP from the WRAP start to the WRAP end of each WRAP in order from the WRAPs on the beginning side may be considered. In this case, data is written up to the EOT in the WRAPs on the beginning side. However, the closer the position of data to be read is to the EOT, the more the time to run the tape for positioning the magnetic head at that position of data is required, and therefore it takes time to start data reading. In addition, in a case where the end of data is placed at an intermediate point of a reverse WRAP, data will not be written to the BOT side at which the magnetic head may be intrinsically positioned in a shorter period of time in the WRAP. For this reason, time is wasted for running the tape for positioning the magnetic head.

Therefore, another method is considered, in which a wrap turn position is set at an intermediate point of a WRAP, and the WRAP is necessarily reversed at that wrap turn position during performing data writing in a forward WRAP. FIG. 6 illustrates an example of such a method.

In this method, a wrap turn position 133a is set, which is common for each forward WRAP. For example, the wrap turn position 133a is set at a position corresponding to the amount of data, which is obtained by dividing the upper limit of the limited write capacity by the total number of WRAPs, starting from the BOT. Note that, the wrap turn position 133a may be set to a predetermined position in the area from the position obtained by such an expression to the point before the EOT.

The tape drive 120 performs the following write process in accordance with an instruction received from the controller 110. When the tape drive 120 reaches the wrap turn position 133a during performing data writing on the forward WRAP, the tape drive 120 writes a WRAP mark to the forward WRAP to perform the WRAP reverse. The tape drive 120 writes a WRAP mark to the wrap turn position 133a of the next reverse WRAP, and continues data writing on the reverse WRAP.

In the example of FIG. 6, when the tape drive 120 reaches the wrap turn position 133a during performing data writing on a WRAP 134a in the forward direction, the tape drive 120 writes a WRAP mark 135a to the WRAP 134a to perform the WRAP reverse. The tape drive 120 writes a WRAP mark 135b in the next WRAP 134b at the same position as the WRAP mark 135a, and then continues data writing on the WRAP 134b in the reverse direction.

According to this method, in all WRAPs, data is written into the area from the BOT to the wrap turn position 133a. For this reason, the area of the magnetic tape at which the magnetic head is positioned when performing data reading is limited from the BOT to the wrap turn position 133a, and the time to start data reading may be reduced. In addition, even when appending data, the time for positioning the magnetic head to the position where data is to be appended may be reduced. Thus, it is possible to start the appending in a short period of time. In a case where the wrap turn position 133a is a position that is determined by the expression described above, it is possible to minimize the time for positioning the magnetic head.

However, this method has the following problem. As illustrated in FIG. 6, when the wrap turn position 133a reaches at an intermediate point of a file area 300 of one file, the WRAP reverse is performed. When the file is divided into data blocks X1 to X12 and reaches the wrap turn position 133a when the writing of the data block X11 is completed, the WRAP mark 135a is written after the data block X11, and the WRAP reverse is performed. In the next WRAP 134b, after the WRAP mark 135b is written, the remaining data block X12 is written in the reverse direction.

In a case where a file in the file area 300 is requested to be read in a state where this type of writing is performed, the WRAP reverse occurs during reading the file. The WRAP reverse takes a certain amount of time because at least operations to stop and resume running of the magnetic tape occur. For this reason, as compared with the case of reading a file which is entirely recorded within one WRAP, the time to read the file becomes much longer.

As a method for solving such a problem, a method illustrated in the following FIG. 7 may be considered. FIG. 7 is a diagram illustrating an example of a second write process in the 36-track mode. In a case where the tape drive 120 reaches the wrap turn position 133a during writing to the WRAP 134a in the file area 300, the tape drive 120 continues the writing until the end of the file area 300. The tape drive 120 writes a WRAP mark 135c after an end position 133b of the file area 300 and performs the WRAP reverse. The tape drive 120 writes a WRAP mark 135d in the next WRAP 134b at the same position as the WRAP mark 135c. In a case where writing of the next file is requested, data writing is performed on the WRAP 134b in the reverse direction following the WRAP mark 135d.

Thus, when the tape drive 120 reads the file in the file area 300, the tape drive 120 does not have to perform the WRAP reverse during reading the file area 300. Therefore, it is possible to read the file in a shorter time than the case illustrated in FIG. 6 by the time desired for the WRAP reverse.

Figure 7:
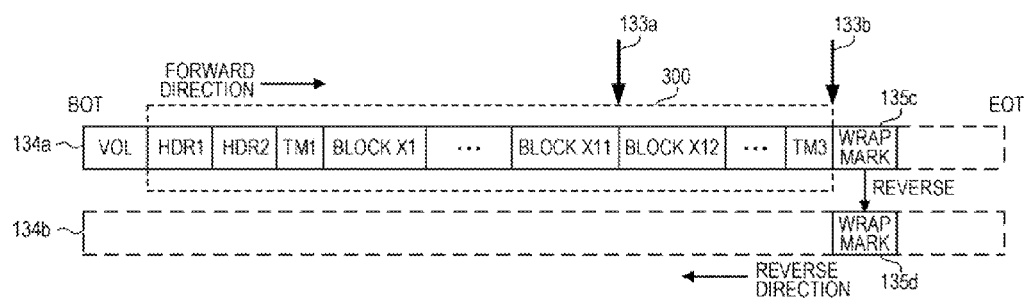
FIG. 7 is a diagram illustrating an example of a second write process in a 36-track mode.

However, the methods illustrated in FIGS. 6 and 7 have the following problem. In the methods of FIGS. 6 and 7, the area close to the BOT is repeatedly used to reduce the read time. Due to the repeated use, for example, an error is likely to occur when performing data reading. If an error occurs, a retry occurs to read the data, and the time to read the data from the magnetic tape becomes longer.

Therefore, according to the present embodiment, in the initial state, data reading and writing are performed on the magnetic tape by using the area closest to the BOT by the methods of FIG. 6 or 7. The number (retry count) of retries in each track is counted, and in a case where the retry count in a certain track exceeds a threshold, the track is reserved as a copy target. At a predetermined later timing, the data recorded in the reserved track is copied within the same track to a copy destination area, which is adjacent to the copy source area, on the EOT side. The data in the copy destination area becomes the target in the subsequent reading. This reduces the probability of occurrence of a retry when performing data reading on the reserved track and it is possible to suppress the increase in time to read the data due to the frequent retries.

Next, a specific example of read and write operations in the 36-track mode according to the present embodiment will be described with reference to FIGS. 8 to 10. It is assumed that the timing for copying data from the reserved track is, For example, a timing at which unmount of the tape cartridge 130 is instructed by the host apparatus 200. However, the timing of data copy is not limited thereto. For example, in a case where a time period during which data reading on the magnetic tape is not requested by the host apparatus 200 is identified, data copy may be performed during this time period.

Figure 8:
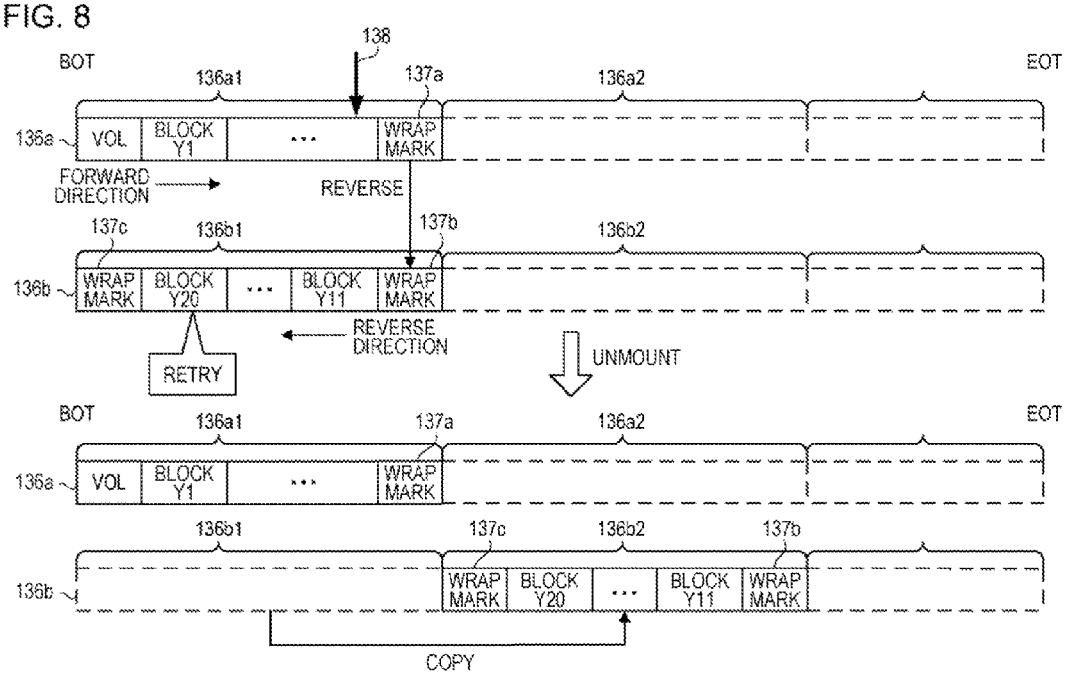
FIG. 8 is a diagram illustrating a specific example of copy process at a time of unmounting.
Figure 9:
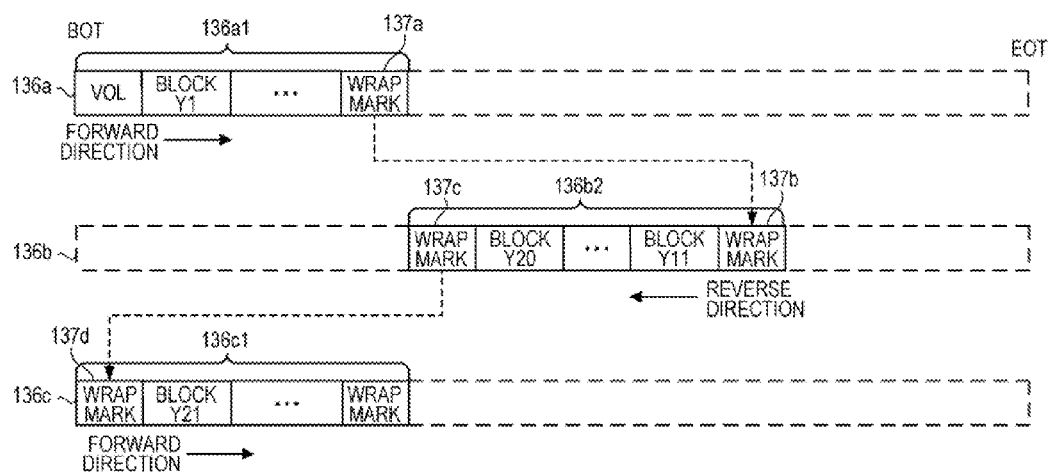
FIG. 9 is a diagram illustrating a specific example of a read process after remount.
Figure 10:
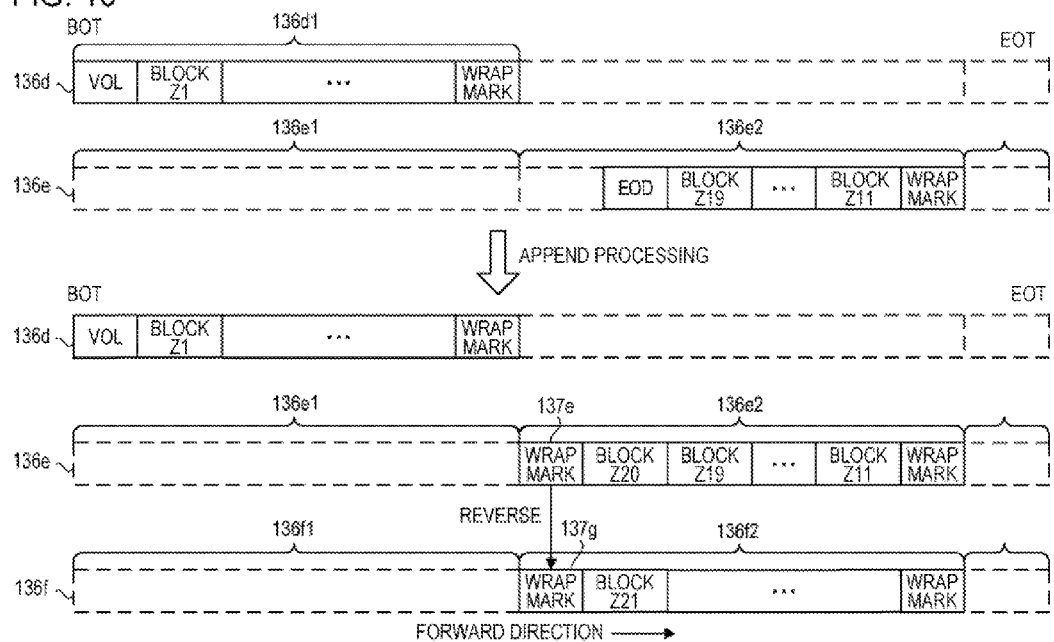
FIG. 10 is a diagram illustrating a specific example of a data append process.

In FIGS. 8 to 10, the HDR1, the HDR2, the TM1 to be recorded at the beginning of the file area, and the TM2, the EOF1, the EOF2, and the TM3 to be recorded at the end of the file area are omitted.

FIG. 8 is a diagram illustrating a specific example of copy process at the time of unmounting. In FIG. 8, a WRAP 136*a* is a forward WRAP. A WRAP 136*b* is a reverse WRAP to be read or written after the WRAP 136*a*.

According to the present embodiment, the magnetic tape is divided into a plurality of areas having the same capacity. Hereinafter, these areas are referred to as a "tape segment". In the following description, it is assumed that the magnetic tape is divided into 4 tape segments as an example. With such division, each WRAP is also divided into 4 WRAP segments (or simply "segments"). In the following description, a "segment" refers to an area, which is contained in one tape segment, within one WRAP.

In FIG. 8, the WRAP 136*a* is divided into 4 segments, and segments 136*a*1 and 136*a*2 belong to the first tape segment and the second tape segment from the BOT side, respectively. The WRAP 136*b* is also divided into 4 segments, and segments 136*b*1 and 136*b*2 belong to the first tape segment and the second tape segment from the BOT side, respectively.

In the initial state, data is written by the method of FIG. 6 or 7 using only the first tape segment from the BOT side. In a case where the method of FIG. 6 is used, capacity of one segment is defined as the capacity from the BOT to the wrap turn position 133*a* in the WRAP 134*a* of FIG. 6. Therefore, for example, in a case where data is written to the WRAPs 136*a* and 136*b* of FIG. 8 using the method of FIG. 6, the tape drive 120 writes the data in the segment 136*a*1 in the forward direction, and writes the WRAP mark 137*a* in the segment 136*a* at the end of the EOT side. Then, the tape drive 120 reverses the write direction, writes a WRAP mark 137*b* in the segment 136*b*1 at the end of the EOT side, and writes the data in the segment 136*b*1 in the reverse direction.

In a case where the method of FIG. 7 is used, capacity of one segment is set to a capacity obtained by adding a predefined surplus capacity to the capacity from the BOT to the wrap turn position 133*a* in the WRAP 134*a* of FIG. 7. For example, in a case where data is written to the WRAPs 136*a* and 136*b* of FIG. 8 using the method of FIG. 7, the tape drive 120 writes the data in the segment 136*a*1 in the forward direction. In a case where a write position reaches a standard wrap turn position 138 during writing the file, the tape drive 120 continues to write in the forward direction to write the WRAP mark 137*a* at the next of the end of the file area as illustrated in the upper part of FIG. 8. However, in a case where the write position reaches the end of the segment 136*a*1 during writing the file, the WRAP mark 137*a* is written at that point. Then, the tape drive 120 reverses the write direction, writes a WRAP mark 137*b* in the segment 136*b*1 at the same position as the WRAP mark 137*a*, and writes the data in the segment 136*b*1 in the reverse direction with the WRAP mark 137*b* as a beginning point.

The data recorded in the segments 136*a*1 and 136*b*1 is read by the following process. The tape drive 120 reads the data stored in the segment 136*a*1 in the forward direction, and performs the WRAP reverse when the WRAP mark 137*a* is detected. After the WRAP reverse, the tape drive 120 reads the data stored in the segment 136*b*1 from WRAP mark 137*b* toward a WRAP mark 137*c* in the reverse direction.

In a case where the tape drive 120 fails to write data to a WRAP, the write operation is retried. In a case where the tape drive 120 fails to read data from a WRAP, the read operation is retried. The read retry count and the write retry count are recorded in the cartridge memory 130*a* for each WRAP. Then, each time a retry (write retry) of data writing or a retry (read retry) of data reading is performed, the tape drive 120 increases the corresponding retry count stored in the cartridge memory 130*a*.

According to the present embodiment, the controller 110 obtains the read retry count and the write retry count for each WRAP from the cartridge memory 130*a*. Then, the controller 110 determines whether or not either of the retry counts exceeds a predetermined threshold. Here, it is assumed that the read retry count or the write retry count for the WRAP 136*b* exceeds the threshold. In this case, the controller 110 reserves the WRAP 136*b* as a copy target.

After completion of the read process as described above, the controller 110 receives, from the host apparatus 200, an instruction (unmount instruction) to unmount the tape cartridge. The lower part of FIG. 8 illustrates a copy process to be performed after the unmount instruction is received.

The controller 110 instructs the tape drive 120 to copy the data stored in the segment 136*b*1 to the adjacent segment 136*b*2. The tape drive 120 copies the data stored in the segment 136*b*1 to the adjacent segment 136*b*2. In this process, the data image of the entire segment 136*b*1 may be copied to the segment 136*b*2.

Next, a case where the tape cartridge 130 is remounted to read data, will be described using a specific example. FIG. 9 is a diagram illustrating a specific example of a read process after remount. The controller 110 receives a read request from the host apparatus 200. The read request includes information indicating a data block Y1 at a read start position.

The controller 110 identifies the position of the data block Y1. After identifying, the controller 110 instructs the tape drive 120 to move the magnetic head to the position of the data block Y1. After instructing, the controller 110 issues a Read command to the tape drive 120.

When the tape drive 120 receives the Read command from the controller 110, the tape drive 120 reads data from the segment 136a1 in the forward direction with the data block Y1 as a beginning point. When the WRAP mark 137a is read, the controller 110 determines in which segment of the next WRAP 136b data is recorded. Information indicating in which segment of the WRAP 136b data is recorded is recorded in the cartridge memory 130a. When the controller 110 determines that data is recorded in the segment 136b2 of the WRAP 136b, the controller 110 instructs the tape drive 120 to move the magnetic head to the position of the WRAP mark 137b in the segment 136b2.

The tape drive 120 moves the magnetic head to the position of the WRAP mark 137b and reads data in the reverse direction from the position of the WRAP mark 137b to the position of the WRAP mark 137c. When the WRAP mark 137c is read, the controller 110 determines that data is recorded in a segment 136c1 of the next WRAP 136c. Then, the controller 110 instructs the tape drive 120 to move the magnetic head to the position of a WRAP mark 137d in the segment 136c1. The tape drive 120 moves the magnetic head to the position of the WRAP mark 137d. Then, the tape drive 120 reads data from the position of the WRAP mark 137d in the forward direction.

According to the above process in FIGS. 8 and 9, the data stored in the segment 136b1 for which the retry count exceeds the threshold is copied to the adjacent segment 136b2. The segment 136b2 is an area on which data reading and writing is not performed. Therefore, in a case where the tape drive 120 reads data from the segment 136b2, the likelihood of performing a retry is low. On the other hand, in a case where data is continuously read from the segment 136b1, the retry count is likely to increase in the future. Thus, as comparison with the case of reading data from the segment 136b1, it is more likely to reduce the time to read data when reading data from the segment 136b2.

The data stored in the segment 136b1 is copied to the adjacent segment 136b2. By copying the data to the adjacent segment 136b2, in the case of reading data, the time to move the magnetic head is reduced. Thus, it is possible to reduce the time to read the data by copying the data to the segment 136b2 rather than copying the data to the segments of WRAP 136b other than the segment 136b2.

Furthermore, since the segment 136b1 is likely to be degraded, there is a possibility that the data stored in the segment 136b1 may be lost. As described above, it is possible to reduce the possibility of data loss by copying the data of the segment 136b1 in the adjacent area.

Next, a case of appending data to the magnetic tape will be described using a specific example. FIG. 10 is a diagram illustrating a specific example of a data append process. WRAPs 136d and 136f are forward WRAPs. A WRAP 136e is a reverse WRAP. As illustrated in the upper part of FIG. 10, it is assumed that data is recorded in a segment 136d1 of the WRAP 136d in the forward direction, data is subsequently recorded in a segment 136e1 of the WRAP 136e in the reverse direction, and the writing is terminated. It is also assumed that, thereafter, the retry count for the segment 136e1 exceeds the threshold and the data in the segment 136e1 is copied to the adjacent segment 136e2. It is further assumed that data is written to only an intermediate point of the segment 136e2 and the end of the BOT side of the segment 136e2 is away from the EOD within the segment 136e2.

In this state, it is assumed that a write request for writing new data is received from the host apparatus 200. The controller 110 instructs the tape drive 120 to move the magnetic head to the EOD position. The tape drive 120 moves the magnetic head to the EOD position within the segment 136e2.

The tape drive 120 starts writing data from the EOD position in accordance with an instruction received from the controller 110. At this time, the EOD is overwritten by the new data. When the tape drive 120 writes data to the end of the BOT side of the segment 136e2, the tape drive 120 writes a WRAP mark 137e to the segment 136e2 in accordance with an instruction received from the controller 110, and the WRAP reverse is performed.

At this time, the data write area in the next WRAP 136f is not an unused segment 136f1 but a segment 136f2 belonging to the same tape segment as the tape segment to which the segment 136e2 belongs. That is, the tape drive 120 writes a WRAP mark 137g to the segment 136f2 in accordance with an instruction received from the controller 110. Then, the tape drive 120 performs data writing in the forward direction from the position of the WRAP mark 137g.

In this way, after the data is written to the segment 136e2, data is written to the segment 136f2 belonging to the same tape segment as the tape segment to which the segment 136e2 belongs. With such a way of data writing, in a case where data is read across the WRAPs 136e and 136f, the WRAP reverse is performed at the position of the WRAP mark 137e, making the distance to move the magnetic head shortened. Therefore, it is possible to reduce the time to read data.

Figure 11:
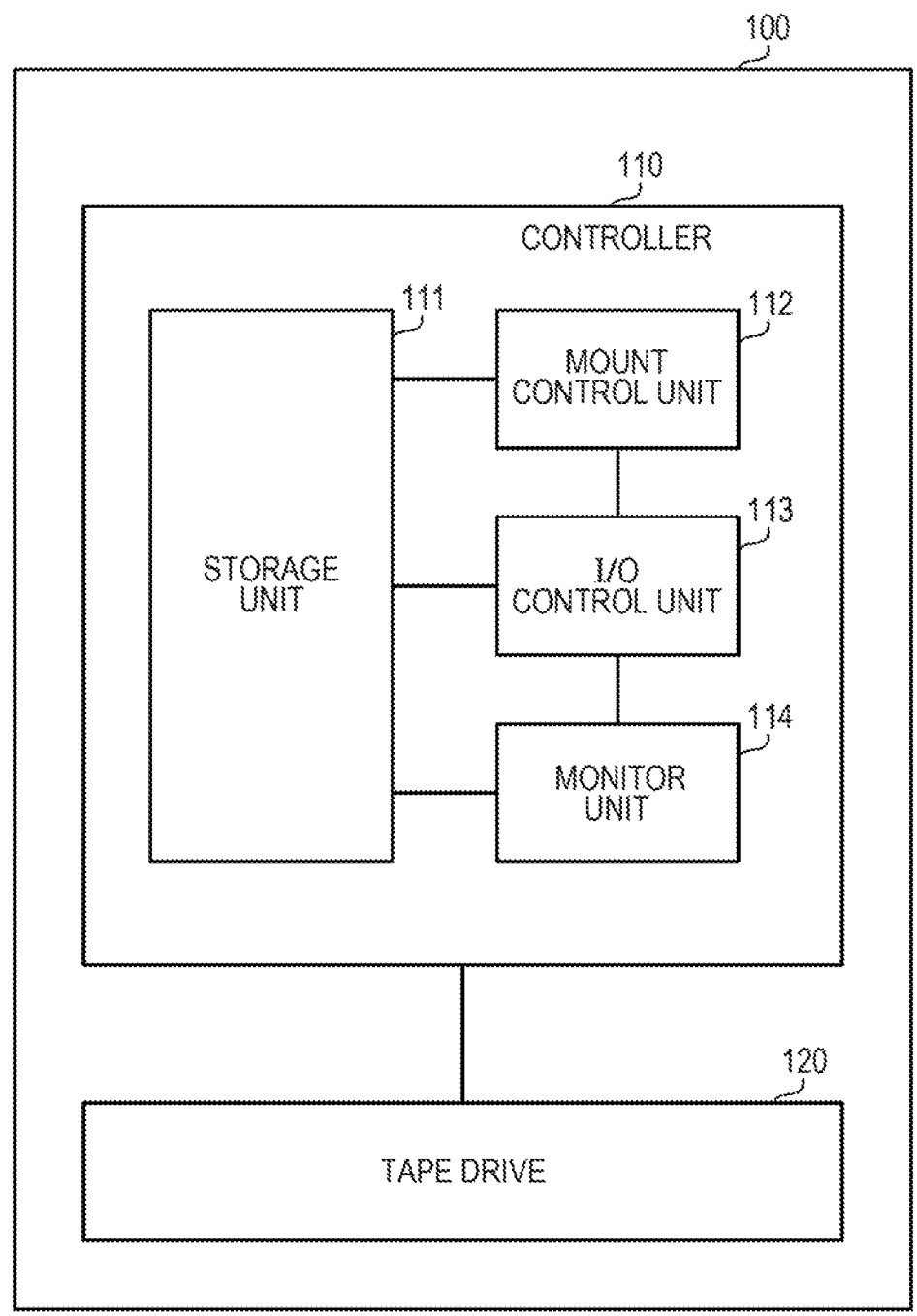
FIG. 11 is a diagram illustrating an exemplary functional configuration of a controller.

Next, the controller 110 will be described. In the following description, it is assumed that data writing is performed by the method illustrated in FIG. 7. FIG. 11 is a diagram illustrating an exemplary functional configuration of the controller. The controller 110 includes a storage unit 111, a mount control unit 112, an input/output (I/O) control unit 113, and a monitor unit 114.

The storage unit 111 is implemented, for example, as a storage area secured in the RAM 110b or the flash memory 110c. The storage unit 111 stores therein a medium specification table, a medium information table, and a write management table.

In the medium specification table, specification information such as the number of WRAPs corresponding to the generation of LTO is registered. In the medium information table, information about the mounted tape cartridge 130 such as a serial number of the tape cartridge 130, the remaining capacity, and the capacity of the data stored in each WRAP is registered. In the write management table, management information for controlling data write operations is registered.

The mount control unit 112, the I/O control unit 113, and the monitor unit 114 are implemented, for example, as a module of a program executed by the processor 110a. When the mount control unit 112 receives a mount instruction from the host apparatus 200, the mount control unit 112 instructs the tape drive 120 to mount the tape cartridge 130. When the tape cartridge 130 is mounted, the mount control unit 112 calculates a standard WRAP capacity indicating a data capacity from the end of the BOT side of a segment to a standard wrap turn position. The standard wrap turn position is a standard position for performing the WRAP reverse at an intermediate point of a segment in a forward WRAP, and is determined before starting a write operation. The standard wrap turn position corresponds to the wrap turn position 133a of FIG. 7.

The mount control unit 112 divides one WRAP to a plurality of segments. The capacity of one segment is a capacity obtained by adding a capacity of the surplus area to the standard WRAP capacity. When the mount control unit 112 receives an unmount instruction from the host apparatus 200, the mount control unit 112 identifies a WRAP serving as a copy target. The mount control unit 112 instructs the tape drive 120 to copy the data stored in the identified WRAP to a segment adjacent to the segment where the data is stored. When the copy operation performed by the tape drive 120 is completed, the mount control unit 112 instructs the tape drive 120 to unmount the tape cartridge 130.

When the I/O control unit 113 receives an I/O instruction from the host apparatus 200, the I/O control unit 113 instructs the tape cartridge 130 to perform the I/O operation on the magnetic tape within the mounted tape cartridge 130 in accordance with the I/O instruction. I/O instructions received from the host apparatus 200 include write instructions and read instructions. The write instructions include a write instruction (label write instruction) of writing a label, a write instruction (marker write instruction) of writing a marker, a write instruction (data block write instruction) of writing a data block obtained by dividing a file, and the like.

Write control modes of the I/O control unit 113 include a normal control mode and a high-speed control mode. The normal control mode is a mode of writing data end to end from the BOT to EOT. The high-speed control mode is a mode in which reading and writing is performed using only one of a plurality of segments in each WRAP. The high-speed control mode is a control mode for improving the read performance by reducing the time for positioning the magnetic head when performing data reading.

When performing data writing in the 36-track mode, the high-speed control mode is selected. The I/O control unit 113 basically controls the tape cartridge 130 so as to reverse the write direction at the standard wrap turn position within a segment during performing data writing on a forward WRAP in the high-speed control mode. However, in a case where the I/O control unit 113 reaches the standard wrap turn position during writing the file, the I/O control unit 113 controls the tape cartridge 130 so as to reverse the write direction after writing data in the forward direction to the end of the file area corresponding to the file.

When the tape drive 120 remounts the tape cartridge 130 after unmounting, the I/O control unit 113 performs a data read process or a data write process using the medium information table.

A monitor unit 114 obtains the retry count for each WRAP from the cartridge memory 130a of the tape cartridge 130. For example, the monitor unit 114 periodically obtains the retry count from the cartridge memory 130a. The monitor unit 114 determines whether or not the retry count for a WRAP exceeds the threshold. In a case where the retry count is equal to or greater than the threshold, the monitor unit 114 reserves the WRAP as a copy target.

FIG. 12 is a diagram illustrating an example of a medium specification table. A medium specification table 111a is stored in the storage unit 111. The medium specification table 111a includes items of "generation", "data capacity", "number of tracks", and "number of WRAPs per data band". In the item of "generation", a generation of LTO is registered. In the item of the "data capacity", an amount of data that may be recorded on a magnetic tape is registered. In the item of "number of tracks", the number of tracks in an entire magnetic tape is registered. In the item of "number of WRAPs per data band", the number of WRAPs included in one data band is registered.

In the medium specification table 111a, for example, information is registered, in which the generation is "LTO1", the data capacity is "100 GB", the number of tracks is "384", and the number of WRAPs per data bands is "12". This indicates that, in the case of LTO Ultrium1 (LTO1), the amount of data that may be recorded on a magnetic tape is "100 GB", the number of tracks is "384", and the number of WRAPs per data band is "12".

Figure 13:
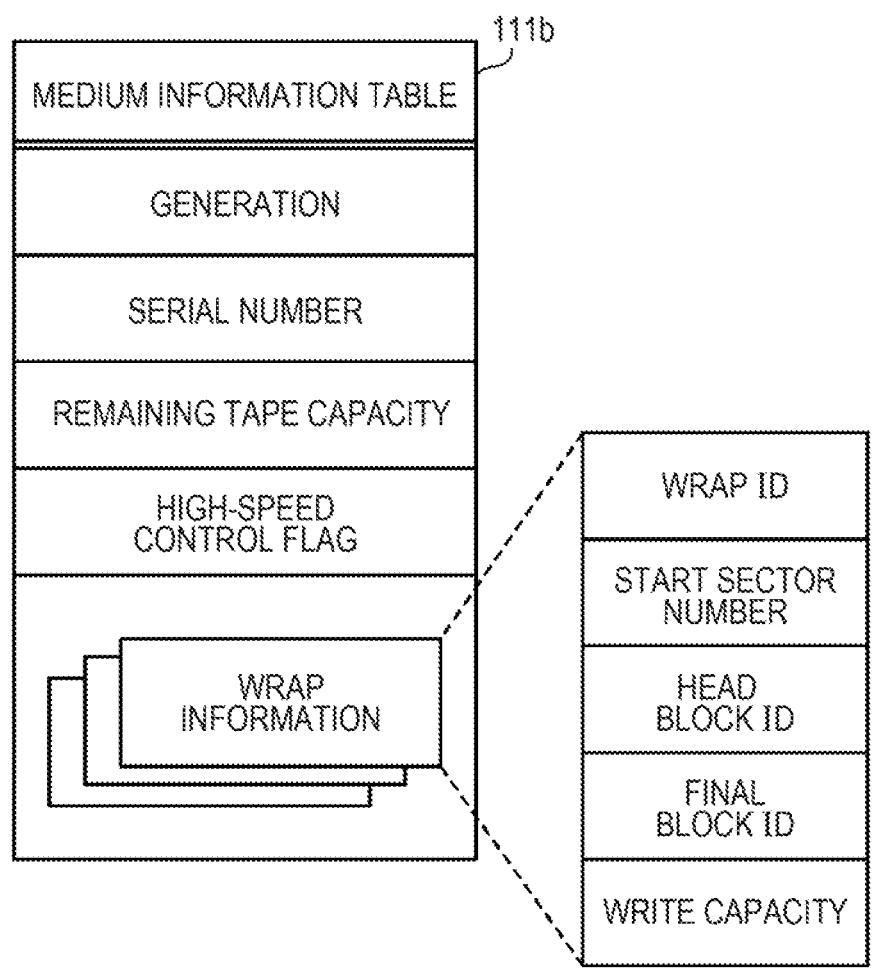
FIG. 13 is a diagram illustrating an example of a medium information table.

FIG. 13 is a diagram illustrating an example of a medium information table. A medium information table 111b is stored in the storage unit 111. The medium information table 111b includes items of "generation", "serial number", "remaining tape capacity", and "high-speed control flag".

In the item of "generation", the generation of LTO is registered. In the item of "serial number", the serial number of the tape cartridge 130 is registered. In the item of "remaining tape capacity", the remaining capacity of the magnetic tape is registered.

In the item of "high-speed control flag", information indicating whether or not to set the high-speed control mode is registered. In the item of "high-speed control flag", either of "true" indicating that the high-speed control mode is set, or "false" indicating that the high-speed control flag is not set, is registered. In a case where the tape cartridge 130 is unused, in the item of "high-speed control flag", either of "false" or "- (hyphen)" is registered.

The medium information table 111b further includes WRAP information. The WRAP information is provided for each WRAP of the magnetic tape within the corresponding tape cartridge 130. The WRAP information includes items of "WRAP identifier (ID)", "start sector number", "head block ID", "final block ID", and "write capacity".

In the item of "WRAP ID", information for identifying a WRAP is registered. In the item of "start sector number", a sector number indicating a position at which data reading is started is registered. In the item of "head block ID", information indicating the head data block among the data blocks stored in a valid segment within the WRAP is registered. In the item of "final block ID", information indicating the final data block among the data blocks stored in the valid segment within the WRAP is registered. In the item of "write capacity", the capacity of data already stored in the valid segment within the WRAP is registered.

The valid segment is a segment on which data reading or data writing is performed. For example, in a case where copying from a segment on the WRAP to another segment is performed, the segment of the copy destination in the last performed copy operation is a valid segment. The beginning position of the area in which data is already recorded in the valid segment is registered in the item of "start sector number".

Note that, information having the same data structure as the medium information table 111b is also recorded in the cartridge memory 130a of the tape cartridge 130. When the cartridge memory 130a is mounted on the tape drive 120, the controller 110 reads the information recorded in the cartridge memory 130a and records the information in the storage unit 111 as the medium information table 111b. The controller 110 reflects the update of the information in the medium information table 111b to the corresponding information recorded in the cartridge memory 130a. In addition, the tape drive 120 updates the item of "remaining tape capacity" recorded in the cartridge memory 130a by itself when unmounting the tape cartridge 130.

Figure 14:
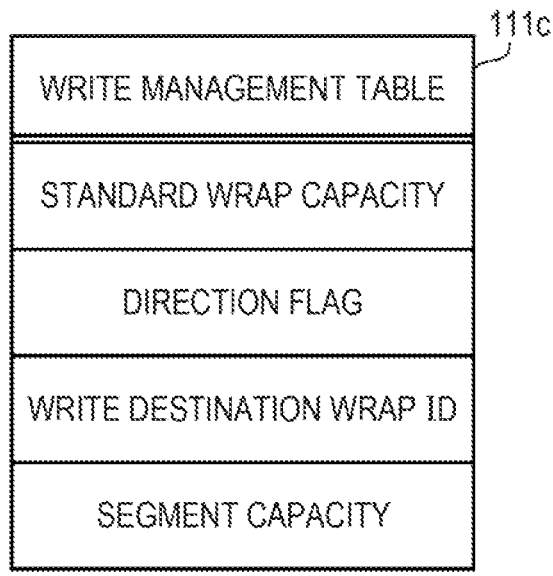
FIG. 14 is a diagram illustrating an example of a write management table.

FIG. 14 is a diagram illustrating an example of a write management table. A write management table 111c is stored in the storage unit 111. The write management table 111c includes items of "standard WRAP capacity", "direction flag", "write destination WRAP ID", and "segment capacity".

The standard WRAP capacity indicates a data capacity of a WRAP from the end of the BOT side of a segment up to the standard wrap turn position. For example, the standard WRAP capacity is obtained from the relationship between the maximum capacity of data that may be written in the 36-track mode and the number of WRAPs. In the example of FIG. 7, the standard wrap turn position corresponds to the wrap turn position 133a, and the standard WRAP capacity corresponds to the data capacity of the WRAP 134a from the BOT to the wrap turn position 133a. The direction flag is flag information indicating the current write direction. The write destination WRAP ID is identification information for identifying a WRAP serving as the current write destination. The segment capacity is a capacity obtained by adding a capacity of a surplus area to the standard WRAP capacity.

Figure 15:
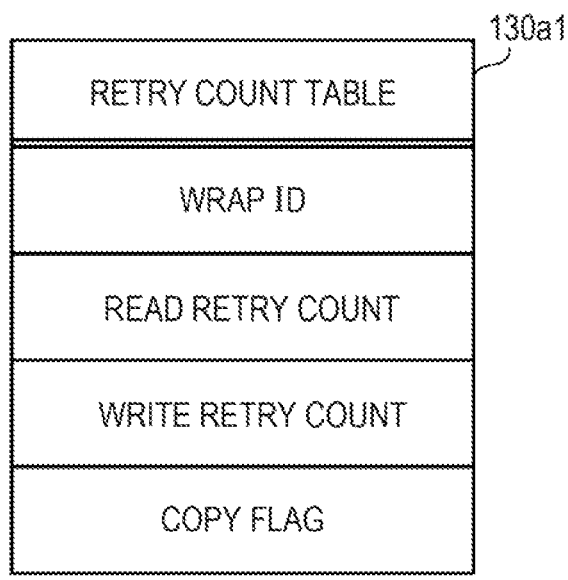
FIG. 15 is a diagram illustrating an example of a retry count table.

FIG. 15 is a diagram illustrating an example of a retry count table. A retry count table 130a1 is created for each WRAP, and stored in the cartridge memory 130a. The retry count table 130a1 includes items of "WRAP ID", "read retry count", "write retry count", and "copy flag". In the item of "WRAP ID", information for identifying a WRAP is registered. In the item of "read retry count", the number of times that the tape drive 120 has retried during performing data reading on a corresponding WRAP is registered. In the item of "write retry count", the number of times that the tape drive 120 has retried during performing data writing on the corresponding WRAP is registered. In the item of "copy flag", information indicating whether or not copying is performed is registered. In the item of "copy flag", either "true" indicating that copying is performed (that is, the corresponding WRAP is reserved as a copy target) or "false" indicating that copying is not yet performed is registered.

When a retry is performed during performing data reading or data writing, the tape drive 120 increments the corresponding retry count in the retry count table 130a1. For example, the controller 110 periodically reads the information recorded in the retry count table 130a1 and determines whether or not there is a WRAP for which the retry count exceeds the threshold.

Figure 16:
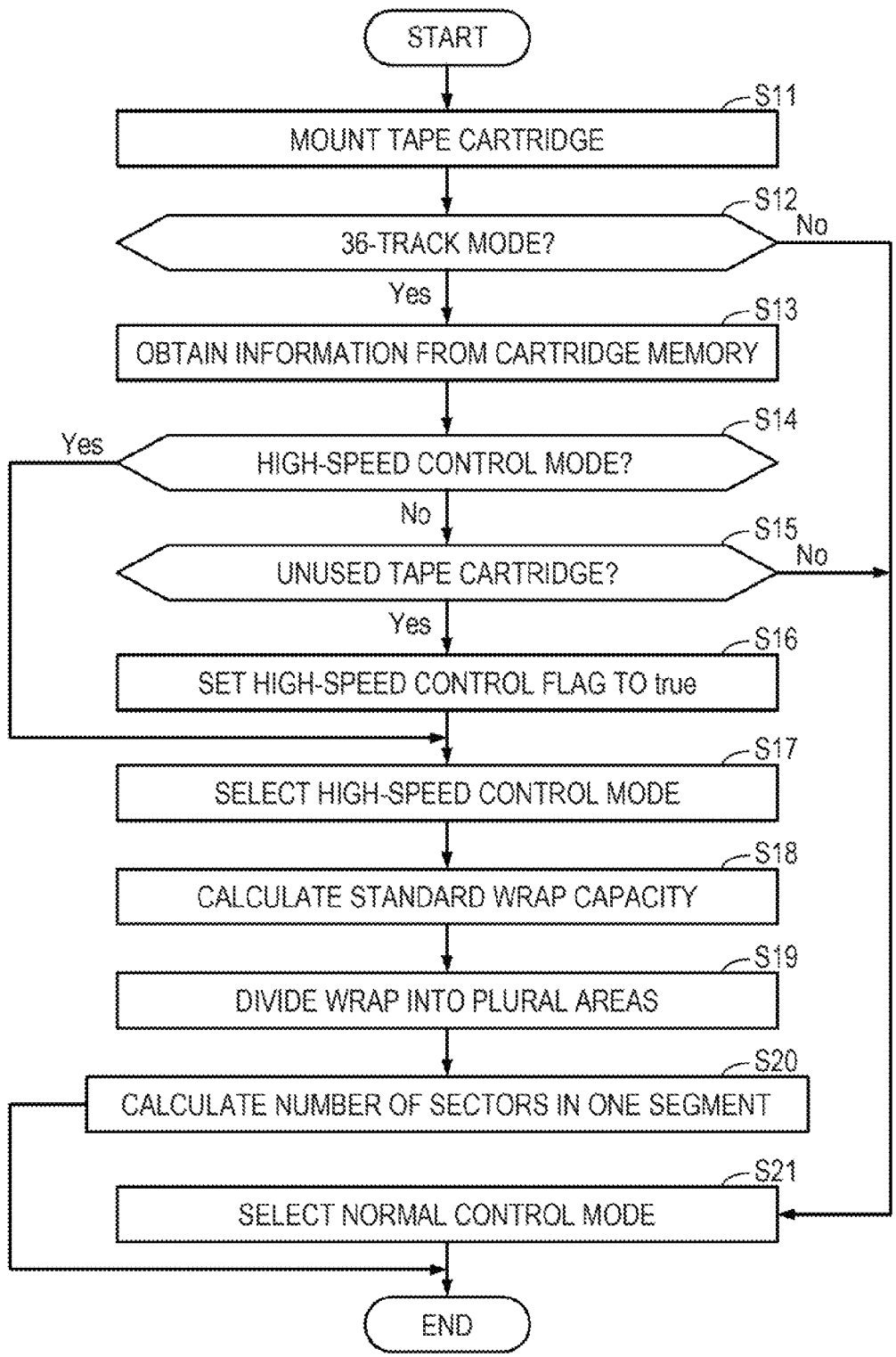
FIG. 16 is a flowchart illustrating an exemplary process of mounting a tape cartridge.

FIG. 16 is a flowchart illustrating an exemplary process of mounting a tape cartridge. Hereinafter, the process illustrated in FIG. 16 will be described. The process in FIG. 16 starts when the mount control unit 112 receives a mount instruction from the host apparatus 200. The mount control unit 112 receives designation of a write mode from the host apparatus 200.

(S11) The mount control unit 112 instructs the tape drive 120 to mount the tape cartridge 130. Accordingly, the tape drive 120 mounts the tape cartridge 130.

(S12) The mount control unit 112 determines whether or not the 36-track mode is designated by the host apparatus 200. In a case where the 36-track mode is designated, the process proceeds to S13. In a case where the 36-track mode is not designated, the process proceeds to S21.

(S13) The mount control unit 112 instructs the tape drive 120 to obtain information recorded in the cartridge memory 130a. The information to be obtained is generation, a serial number, a remaining tape capacity, a high-speed control flag, a WRAP ID, and a write capacity of each WRAP. The mount control unit 112 registers the obtained information in the medium information table 111b.

(S14) The mount control unit 112 determines whether or not the high-speed control flag is "true" by referring to the high-speed control flag in the medium information table 111b. In a case where the high-speed control flag is "true", the process proceeds to S17. In a case where the high-speed control flag is "false", the process proceeds to S15.

(S15) The mount control unit 112 determines whether or not the tape cartridge 130 is unused. Specifically, the mount control unit 112 identifies the data capacity corresponding to the generation in the medium information table 111b from the medium specification table 111a. The mount control unit 112 determines that the identified data capacity is unused in a case where the data capacity matches the remaining tape capacity in the medium information table 111b. In a case where the data capacity is unused, the process proceeds to S16. In a case where the data capacity is not unused, the process proceeds to S21.

(S16) The mount control unit 112 sets "true" in the high-speed control flag in the medium information table 111b.

(S17) Since the high-speed control flag in the medium information table 111b is "true", the mount control unit 112 determines to perform data writing in the high-speed control mode.

(S18) The mount control unit 112 calculates the standard WRAP capacity. The mount control unit 112 registers the calculated standard WRAP capacity in the item of "standard WRAP capacity" in the write management table 111c.

The standard WRAP capacity is calculated by the following method. For example, in a case where the size of the data block is 32 KB, the maximum capacity of data that may be written in the 36-track mode is 128 GB (32 KB×4,000,000 data blocks). The standard WRAP capacity is calculated by an expression "128 GB/total number of WRAPs". The total number of WRAPs is calculated by an expression "the number of WRAPs per data band×the number of data bands". Here, the number of WRAPs per data band and the number of data bands may be obtained on the basis of the information of the record corresponding to the generation in the medium information table 111b among the records of the medium specification table 111a. For example, in a case where the generation is LTO4, the standard WRAP capacity is "128 GB/(14×4)" (about 2.3 GB).

The standard WRAP capacity indicates the capacity of the forward WRAP from the end of the BOT side of the segment up to the standard wrap turn position. Therefore, with the above calculation, it is possible to calculate the standard wrap turn position corresponding to the generation of the mounted tape cartridge 130. The calculated standard wrap turn position indicates a wrap turn position closest to the BOT when the maximum capacity of data that may be written in the 36-track mode is written to the magnetic tape in the high-speed control mode. By using such a standard wrap turn position as a reference position (corresponding to the wrap turn position 133a in FIG. 7) for determining whether or not to reverse the WRAP during performing data writing on a segment of a forward WRAP, it is possible to set the position of the WRAP reverse as close to the BOT as possible. As a result, it is possible to reduce time to read the written data.

The standard WRAP capacity is determined on the basis of the maximum capacity of data that may be written in the 36-track mode, and the specification of the magnetic tape. For this reason, for example, the standard WRAP capacity may be registered in advance in the medium specification table 111a for each generation of the magnetic tape. In this case, in S18, the mount control unit 112 may obtain the standard WRAP capacity corresponding to the generation of the mounted magnetic tape from the medium specification table 111a without performing the calculation described above.

(S19) The mount control unit 112 divides each WRAP into a plurality of segments. The segment capacity is calculated by the following method. For example, in a case where the generation is LTO4, first, the mount control unit 112 adds a capacity of a surplus area to the standard WRAP capacity. The surplus area is, for example, about 30% of the standard WRAP capacity. The reason for adding the surplus area is that data may be written to the end position 133b beyond the wrap turn position 133a as illustrated in FIG. 7 for example. The area obtained by adding the surplus area to the area having the standard WRAP capacity is one segment. The capacity of one segment is, for example, the capacity (3 GB) which is obtained by adding the surplus area (about 0.7 GB) to the standard WRAP capacity (2.3 GB). The mount control unit 112 registers the segment capacity in the item of "segment capacity" in the write management table 111c.

Next, the mount control unit 112 calculates the capacity of each WRAP. The capacity of each WRAP is "800 GB/(14×4)" (about 14.3 GB). Thereafter, the mount control unit 112 divides the WRAP into 4 (14.3 GB/3 GB) segments from the BOT side.

(S20) The mount control unit 112 calculates the number of sectors in one segment. For example, in a case where the capacity of one sector is SE, the number of sectors in one segment is "3 GB/SE". In this way, each segment is associated with a sector number. Then, the process is ended.

(S21) Since the 36-track mode is not designated or the tape cartridge 130 is already used in the normal control mode, the mount control unit 112 determines to perform data writing in the normal control mode. Then, the process is ended.

Figure 17:
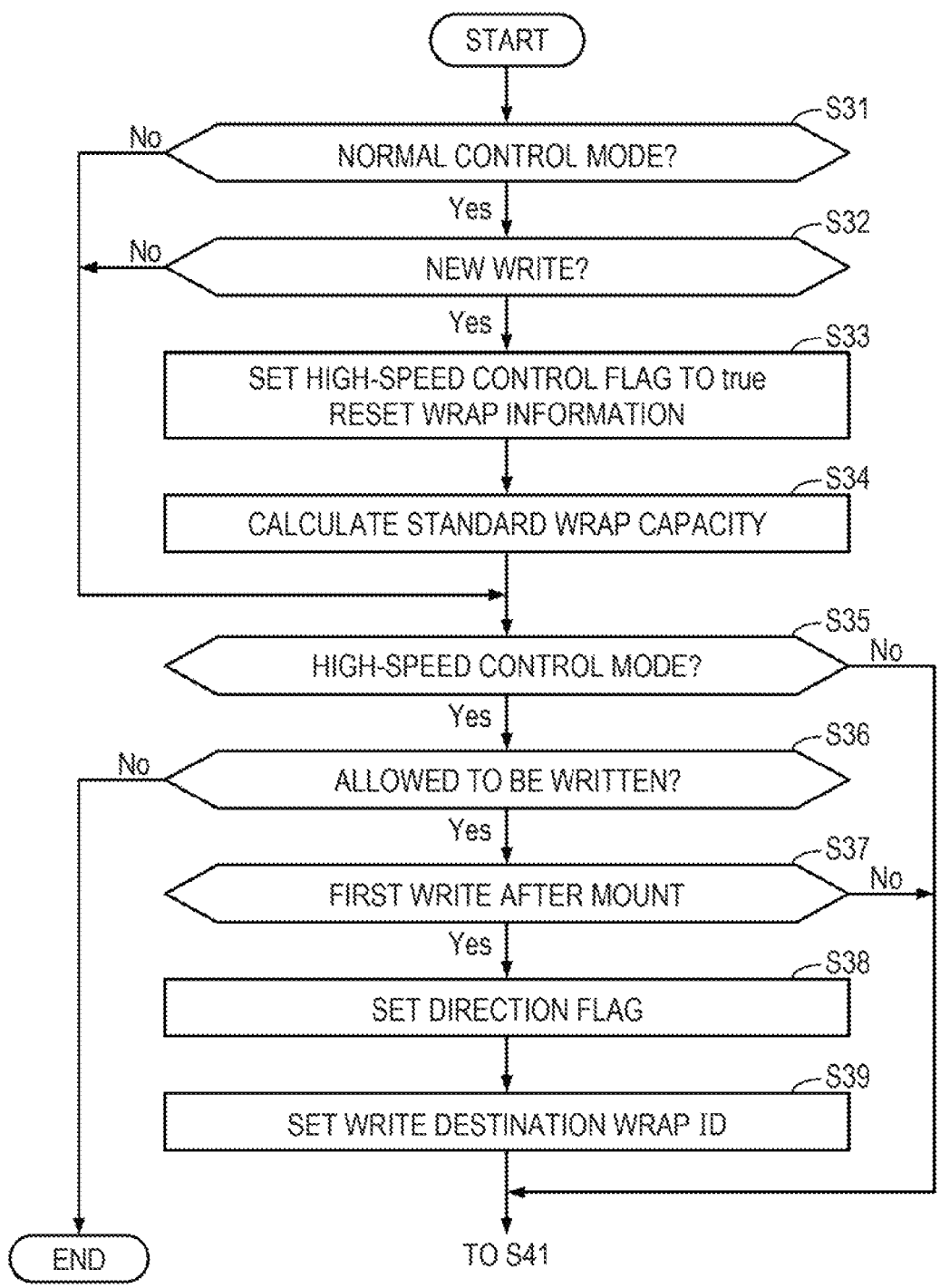
FIG. 17 is a flowchart illustrating an exemplary process of performing data writing.
Figure 18:
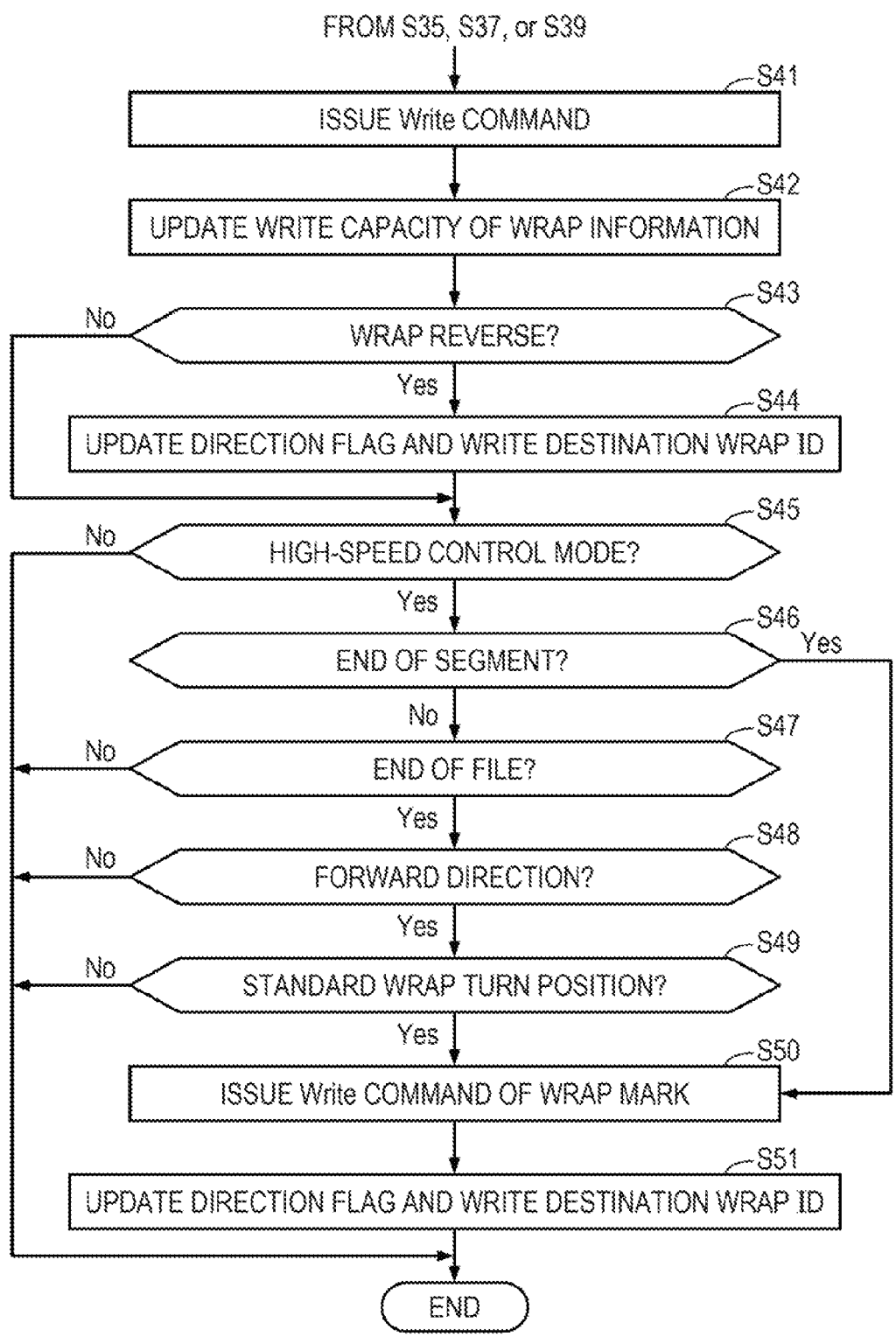
FIG. 18 is a flowchart illustrating an exemplary process of performing data writing.

Next, an exemplary process of performing data writing will be described with reference to FIGS. 17 and 18. The process in FIGS. 17 and 18 is performed each time a write instruction is received from the host apparatus 200. Write instructions include a write instruction (label write instruction) of writing a label, a write instruction (marker write instruction) of writing a marker, a write instruction (data block write instruction) of writing a data block obtained by dividing a file, and the like.

FIG. 17 is a flowchart illustrating an exemplary process of performing data writing. Hereinafter, the process illustrated in FIG. 17 will be described.

(S31) The I/O control unit 113 determines whether or not to perform data writing in the normal control mode by referring to the high-speed control flag in the medium information table 111b. In a case where the high-speed control flag is "false", it is determined to perform data writing in the normal control mode. In the case of performing data writing in the normal control mode, the process proceeds to S32. In the case of performing data writing in the high-speed control mode, the process proceeds to S35.

(S32) The I/O control unit 113 determines whether or not to perform a new write operation even though the tape cartridge 130 is a used medium, by discarding data recorded in the tape cartridge 130. For example, in a case where the magnetic tape is completely rewound after completion of the process in FIG. 16 and just before the process in FIG. 17, the I/O control unit 113 determines that a new write operation is performed, and the process proceeds to S33. In a case where the rewind is not performed just before the process in FIG. 17, the process proceeds to S35. Note that, for example, a predetermined flag within the storage unit 111 is set to "1" when the rewind is performed, and in S32, it may be determined whether or not the rewind is performed on the basis of this flag.

(S33) The I/O control unit 113 sets "true" in the high-speed control flag in the medium information table 111b and determines to perform data writing in the high-speed control mode. In addition, the I/O control unit 113 sets the write capacity in all the WRAP information in the medium information table 111b to "0" to reset all the WRAP information.

(S34) The I/O control unit 113 calculates the standard WRAP capacity and registers the calculated standard WRAP capacity in the write management table 111c. The calculation method is the same as S18. In addition, the I/O control unit 113 calculates the segment capacity and registers the segment capacity in the write management table 111c. The calculation method is the same as S19.

(S35) The I/O control unit 113 determines whether or not to perform data writing in the high-speed control mode by referring to the high-speed control flag in the medium information table 111b. In the case of performing data writing in the high-speed control mode, the process proceeds to S36. In the case of performing data writing in the normal control mode, the process proceeds to S41.

(S36) The I/O control unit 113 determines whether or not data (a label, a marker, or a data block) which is instructed by the host apparatus 200 to be written is allowed to be written. Specifically, the I/O control unit 113 refers to all the WRAP information in the medium information table 111b and calculates the total capacity by summing up the write capacity of all the WRAPs. The I/O control unit 113 determines whether or not the capacity of the data which is instructed by the host apparatus 200 to be written is equal to or smaller than a remaining allowable capacity obtained by subtracting the total capacity from 128 GB which is the maximum capacity of data that may be written in the 36-track mode. In a case where the capacity of the data to be written is equal to or smaller than the remaining allowable capacity, the process proceeds to S37. In a case where the capacity of the data to be written is larger than the remaining allowable capacity, the amount of the already stored data has reached the limit. Therefore, the I/O control unit 113 transmits a notification to the host apparatus 200 that the data is not allowed to be written to the tape cartridge 130. Then, the process is ended.

(S37) The I/O control unit 113 determines whether or not it is the first write operation after mounting the tape cartridge 130. In a case where it is the first write operation, the process proceeds to S38. In a case where it is not the first write operation, the process proceeds to S41.

(S38) The I/O control unit 113 determines whether or not the write direction is the forward direction. Specifically, the I/O control unit 113 performs calculation of the following Expression (1).

$$\text{Remaining tape capacity in the medium information table 111}b/\text{WRAP capacity} \tag{1}$$

The WRAP capacity in Expression (1) is calculated by an expression "data capacity/(number of data bands×the number of WRAPs per data band)" on the basis of the information of the record corresponding to the generation in the medium information table 111b among the records of the medium specification table 111a.

The quotient of Expression (1) indicates the number of remaining WRAPs in which no data is stored at all. In a case where the number of remaining WRAPs is an odd number, the current write direction is determined to be the forward direction, and in a case where the number of remaining WRAPs is an even number, the current write direction is determined to be the reverse direction.

The I/O control unit 113 sets a value corresponding to the determination result about the write direction in the direction flag in the write management table 111c. For example, the I/O control unit 113 sets the direction flag to "0" in a case where the write direction is the forward direction, and sets the direction flag to "1" in a case where the write direction is the reverse direction.

(S39) The I/O control unit 113 determines the current write destination WRAP. When the quotient of the above Expression (1) is assumed to be Q, the (Q+1)-th WRAP from the end is determined as the current write destination WRAP. The I/O control unit 113 registers an ID indicating the determined current write destination WRAP in the item of "write destination WRAP ID" in the write management table 111c. Thereafter, the process proceeds to S41.

FIG. 18 is a flowchart illustrating an exemplary process of performing data writing. Hereinafter, the process illustrated in FIG. 18 will be described.

(S41) The I/O control unit 113 issues a Write command to the tape drive 120 to instruct to perform data writing instructed by the host apparatus 200. The tape drive 120 writes a label, a marker, or a data block of which is instructed by the host to be written, to the magnetic tape of the tape cartridge 130. The tape drive 120 writes the instructed data in the forward direction when the current write direction is the forward direction, and writes the instructed data in the reverse direction when the current write direction is the reverse direction.

In a case where the position at which data writing is completed is a position of the predetermined capacity up to the BOT or the EOT, the tape drive 120 records a WRAP mark at that position and performs the WRAP reverse. The tape drive 120 also records a WRAP mark in the same position of the next WRAP and waits for a next Write command.

(S42) The I/O control unit 113 identifies the WRAP information, which corresponds to the current write destination WRAP, in the medium information table 111b. The I/O control unit 113 updates the write capacity in the WRAP information by adding the amount of the data (a label, a marker, or a data block) written in the magnetic tape in response to the command issued in S41, to the write capacity of the segment in the identified WRAP information.

In a case where a write operation of a data block is instructed in S41, the I/O control unit 113 registers an ID of the block, which is instructed to be written, as the final block ID in the WRAP information corresponding to the current write destination WRAP, in the medium information table 111b. Furthermore, in a case where a write operation of a data block is instructed in S41 and the head block ID is not registered in the WRAP information, which corresponds to the current write destination WRAP, in the medium information table 111b, the I/O control unit 113 registers the ID of the block which is instructed to be written as the head block ID.

(S43) The I/O control unit 113 determines whether or not the WRAP reverse has occurred in the tape drive 120 due to the command issued in S41. Specifically, in a case where the direction flag in the write management table 111c indicates the reverse direction, the I/O control unit 113 calculates a difference between the write capacity of the segment updated in S42 and the write capacity of the segment registered in the WRAP information corresponding to the previous WRAP. The I/O control unit 113 determines that the WRAP reverse has occurred in a case where the calculated difference is equal to or less than a predetermined threshold for determining whether or not the BOT is approached.

In a case where the WRAP reverse has occurred, the process proceeds to S44. In a case where the WRAP reverse has not occurred, the process proceeds to S45.

(S44) The I/O control unit 113 updates the direction flag in the write management table 111c to the other value. In addition, the I/O control unit 113 updates the write destination WRAP ID in the write management table 111c with the ID of the next WRAP.

(S45) The I/O control unit 113 determines whether or not to perform data writing in the high-speed control mode, by referring to the high-speed control flag in the medium information table 111b. In the case of the high-speed control mode, the process proceeds to S46. In the case of the normal control mode, the process is ended.

(S46) The I/O control unit 113 determines whether or not the end of the segment is approached. In a case where the write direction is the forward direction, the I/O control unit 113 calculates a difference between the write capacity of the segment updated in S42 and the segment capacity in the write management table 111c. In a case where the calculated difference is equal to or less than a predetermined amount corresponding to the capacity of one WRAP mark, the I/O control unit 113 determines that the end of the segment is approached. In a case where the write direction is the reverse direction, the I/O control unit 113 determines that the end of the segment is approached in a case where the difference calculated in S43 is equal to or less than the predetermined amount corresponding to the capacity of one WRAP mark.

In a case where data is written up to the end of segment, the process proceeds to S50. In a case where data is not written up to the end of segment, the process proceeds to S47. In a case where the current write direction is the reverse direction and data writing on the segment closest to the BOT is being performed, the process proceeds from S46 to S47 unconditionally.

(S47) The I/O control unit 113 determines whether or not the end of the file area is reached. Specifically, the I/O control unit 113 determines whether or not the Write command issued in S41 is a write instruction of writing TM3. In a case where the Write command is a write instruction of writing TM3, it is determined that the end of the file area is reached. In a case where the end of the file area is reached, the process proceeds to S48. In a case where the end of the file area is not reached, the process is ended.

(S48) The I/O control unit 113 determines the current write direction on the basis of the direction flag in the write management table 111c. In a case where the write direction is the forward direction, the process proceeds to S49. In a case where the write direction is the reverse direction, the process is ended.

(S49) The I/O control unit 113 determines whether or not the write position has reached the standard wrap turn position. Specifically, the I/O control unit 113 identifies the WRAP information, which corresponds to the write destination WRAP ID in the write management table 111c, from the WRAP information in the medium information table 111b. The I/O control unit 113 subtracts the write capacity in the identified WRAP information from the standard WRAP capacity in the write management table 111c. In a case where the subtraction result is 0, it indicates that data is written up to the standard wrap turn position. In a case where the subtraction result is negative, it indicates that data is written beyond the standard wrap turn position. In these cases, it is determined that the write position has reached the standard wrap turn position, and the process proceeds to S50. On the other hand, in a case where the subtraction result is larger than 0, it is determined that the write position has not reached the standard wrap turn position, and the process is ended.

(S50) The I/O control unit 113 issues a Write command to instruct the tape drive 120 to write a WRAP mark. In a case where the WRAP currently being written is a forward WRAP, the tape drive 120 that receives the Write command writes a WRAP mark in the forward WRAP, reverses the write direction, and writes a WRAP mark to the next reverse WRAP as well. In a case where the WRAP currently being written is a reverse WRAP, the tape drive 120 writes a WRAP mark in the reverse WRAP, reverses the write direction, and writes a WRAP mark to the next forward WRAP as well. In either case, the WRAP mark is written to a segment belonging to the same tape segment among the segments of the next WRAP, to which the segment currently being written belongs.

(S51) The I/O control unit 113 updates the direction flag in the write management table 111c. The I/O control unit 113 also updates the write destination WRAP ID in the write management table 111c with the ID of the next WRAP.

In addition, the I/O control unit 113 registers the start sector number of the next WRAP in the medium information table 111b. For example, the start sector number of the next WRAP is the position of the WRAP mark written to the next WRAP in S50. Then, the process is ended.

In a case where a tape cartridge 130 in which data is already recorded in the high-speed control mode is mounted and data is appended immediately after the mount, the following process is performed. First, when the tape cartridge 130 is mounted, the mount control unit 112 reads information from the cartridge memory 130a of the tape cartridge 130. The mount control unit 112 creates the medium information table 111b on the basis of the read information and registers the table in the storage unit 111. Furthermore, the mount control unit 112 registers the standard WRAP capacity and the segment capacity among the items in the write management table 111c as in S18 and S19 of FIG. 16. In addition, the mount control unit 112 calculates the number of sectors in one segment as in S20 in FIG. 16.

Next, when the I/O control unit 113 receives an append instruction from the host apparatus 200, the I/O control unit 113 identifies an append start position on the basis of the WRAP information in the medium information table 111b. The I/O control unit 113 issues a Locate command to instruct the tape drive 120 to move the magnetic head to the append start position, that is, the position of the EOD. Along with this, the I/O control unit 113 registers the direction flag and the write destination WRAP ID in the write management table 111c. Then, the I/O control unit 113 performs the process in and after S41 of FIG. 18 to issue the first Write command. Thereafter, the process in FIGS. 17 and 18 are repeated until the appending is completed.

Figure 19:
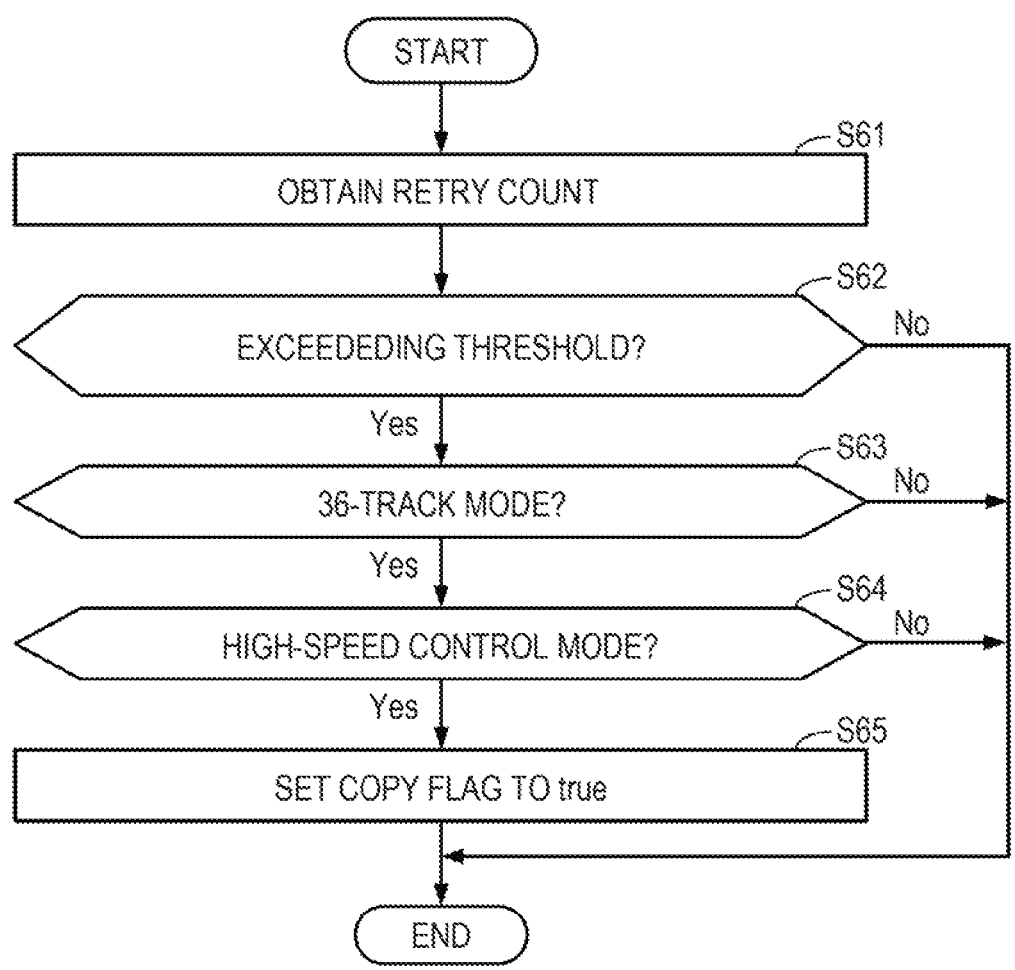
FIG. 19 is a flowchart illustrating an example of a copy determination process.

Next, a copy determination process will be described. The copy determination process is performed in parallel with the write process in FIGS. 17 and 18, or the read process in FIGS. 21 and 22. FIG. 19 is a flowchart illustrating an example of the copy determination process. The process in FIG. 19 is performed at regular time intervals, for example. In addition, the tape drive 120 records the retry count in the cartridge memory 130a. Hereinafter, the process illustrated in FIG. 19 will be described.

(S61) The monitor unit 114 instructs the tape drive 120 to obtain the information in the retry count table 130a1 stored in the cartridge memory 130a. The information to be obtained is the WRAP ID, the read retry count, and the write retry count. The monitor unit 114 obtains these pieces of information from the tape drive 120.

(S62) The monitor unit 114 determines whether or not there is a WRAP in which the read retry count or the write retry count exceeds the threshold on the basis of the obtained information. In a case where there is at least one such WRAP, the process proceeds to S63. In a case where there is no such WRAP, the process is ended.

In a case where there are two or more WRAPs in which the read retry count or the write retry count exceeds the threshold, the process in and after S63 is performed for each of these WRAPs.

In S62, the monitor unit 114 may compare the sum of the read retry count and the write retry count with the threshold.

(S63) The monitor unit 114 determines whether or not the write mode is the 36-track mode. In the case where the write mode is the 36-track mode, the process proceeds to S64. In the case where the write mode is not the 36-track mode, the process is ended.

(S64) The monitor unit 114 determines whether or not the high-speed control flag is "true" by referring to the medium information table 111b. In the case of "true", the process proceeds to S65. In the case of "false", the process is ended.

(S65) The monitor unit 114 instructs the tape drive 120 to set "true" to the copy flag in the retry count table 130a1 corresponding to the WRAP (target WRAP) that satisfies the condition of S62. As a result, the copy flag in the retry count table 130a1 is updated.

In this way, in a case where the retry count exceeds the threshold, it is possible to determine that the quality of the segment in which the retries have occurred is degraded. Then, the WRAP having the segment with degraded quality is reserved for a copy target.

Figure 20:
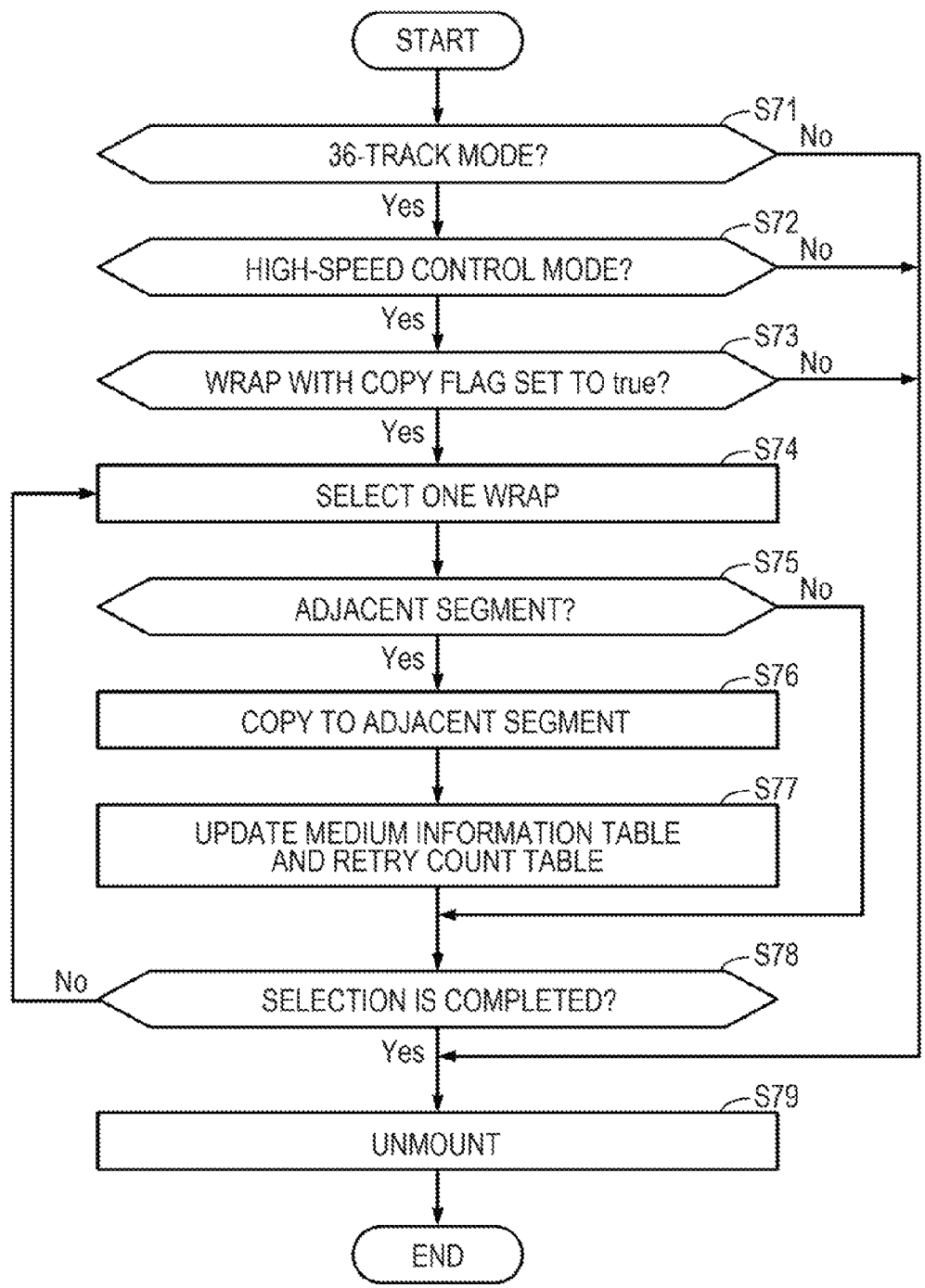
FIG. 20 is a flowchart illustrating an example of an unmount process.

Next, an unmount process will be described. The unmount process is started when the controller 110 receives an unmount instruction from the host apparatus 200. FIG. 20 is a flowchart illustrating an example of an unmount process. Hereinafter, the process illustrated in FIG. 20 will be described.

(S71) The mount control unit 112 determines whether or not the write mode is the 36-track mode. In the case where the write mode is the 36-track mode, the process proceeds to S72. In the case where the write mode is not the 36-track mode, the process proceeds to S79.

(S72) The mount control unit 112 determines whether or not the high-speed control flag is "true" by referring to the medium information table 111b. In the case of "true", the process proceeds to S73. In the case of "false", the process proceeds to S79.

(S73) The mount control unit 112 instructs the tape drive 120 to obtain the information in the retry count table 130a1 stored in the cartridge memory 130a. Specifically, the mount control unit 112 instructs to obtain the WRAP ID and the copy flag in each retry count table 130a1. The mount control unit 112 obtains the WRAP ID and copy flag registered in each retry count table 130a1 from the tape drive 120.

The mount control unit 112 determines whether or not there is a WRAP whose copy flag is "true" on the basis of the obtained information. In a case where there is such a WRAP, the process proceeds to S74. In a case where there is no such a WRAP, the process proceeds to S79.

(S74) The mount control unit 112 selects one WRAP whose copy flag is "true".

(S75) The mount control unit 112 refers to the WRAP information corresponding to the WRAP selected in S74 among the pieces of the WRAP information in the medium information table 111b. The mount control unit 112 identifies a segment to be read and written in the selected WRAP on the basis of the start sector number registered in the WRAP information, the segment capacity, and the WRAP capacity. The mount control unit 112 determines whether or not there is a segment adjacent to the EOT side with respect to the identified segment. In a case where there is an adjacent segment, the process proceeds to S76. In a case where there is no adjacent segment, the process proceeds to S78.

(S76) The mount control unit 112 instructs the tape drive 120 to read data from the identified segment. In this instruction, data reading from the head sector number to the end sector number of the identified segment is instructed. In this way, the mount control unit 112 obtains data image of the identified segment.

Next, the mount control unit 112 instructs the tape drive 120 to write the obtained data image to the adjacent segment. In this instruction, data writing from the head sector number to the end sector number of the adjacent segment is instructed. In this way, the contents of the identified segment as a whole are copied to adjacent segments.

(S77) The mount control unit 112 updates the start sector number in the WRAP information of the WRAP in the medium information table 111b with the sector number of the beginning position where data is recorded in the adjacent segment. In this process, the number of sectors indicating the size of one segment is added to the start sector number registered in the WRAP information.

In addition, the mount control unit 112 instructs the tape drive 120 to update the retry count table 130a1 stored in the cartridge memory 130a. Specifically, in the retry count table 130a1 corresponding to the WRAP, the read retry count and the write retry count are instructed to be reset to 0, respectively, and the copy flag is instructed to be updated to 0. The tape drive 120 updates the retry count table 130a1 corresponding to the WRAP in accordance with the instruction.

(S78) The mount control unit 112 determines whether or not all the WRAPs whose copy flag is "true" have been selected. In a case where all of such WRAPs are selected, the process proceeds to S79. In a case where some of such WRAPs are not selected, the process proceeds to S74.

(S79) The mount control unit 112 instructs the tape drive 120 to unmount the tape cartridge 130. Then, the process is ended. As a result, the tape cartridge 130 is unmounted.

In this way, by performing the copy process when unmounting the tape cartridge during which the write or read process does not occur, the copy process may be performed without affecting the performance of the write or read process.

Figure 21:
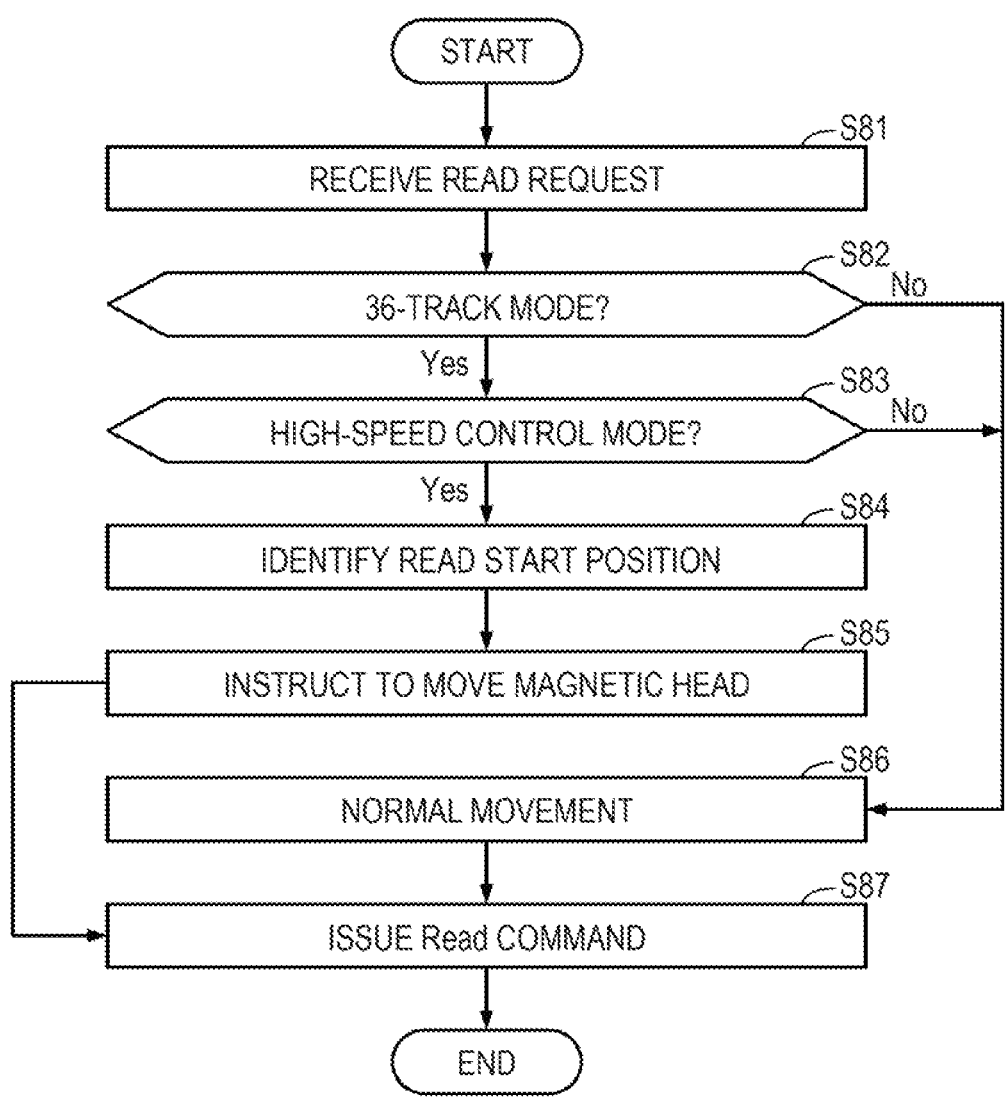
FIG. 21 is a flowchart illustrating an example of a read process.

Next, the read process will be described. FIG. 21 is a flowchart illustrating an example of a read process. Hereinafter, the process illustrated in FIG. 21 will be described.

(S81) The I/O control unit 113 receives a read request from the host apparatus 200. For example, when a read operation is requested, first, a Locate command designating a data block ID of the read start position is issued, and then a Read command is issued. In this case, in S81, the I/O control unit 113 receives the Locate command.

(S82) The I/O control unit 113 determines whether or not the write mode is the 36-track mode. In the case where the write mode is the 36-track mode, the process proceeds to S83. In the case where the write mode is not the 36-track mode, the process proceeds to S86.

(S83) The I/O control unit 113 determines whether or not the high-speed control flag is "true" by referring to the medium information table 111b. In the case of "true", the process proceeds to S84. In the case of "false", the process proceeds to S86.

(S84) The I/O control unit 113 identifies the read start position by using the medium information table 111b. Specifically, the I/O control unit 113 identifies a WRAP to which the data block ID of the read start position belongs in the range from the head block ID to the final block ID by referring to each pieces of WRAP information in the medium information table 111b.

For example, it is assumed that the data block ID of the read start position is "123". It is also assumed that in the WRAP information corresponding to the WRAP ID "3" in the medium information table 111b, the start sector number "4", the head block ID "102", and the final block ID "151" are registered. The I/O control unit 113 determines that the data block ID "123" belongs to the range from the head block ID "102" to the final block ID "151". Then, the I/O control unit 113 determines that the data block ID "123" exists in the WRAP with the WRAP ID "3".

The I/O control unit 113 identifies the sector number of the read start position. In the above example, since the WRAP is a forward WRAP, the I/O control unit 113 identifies the sector number of the read start position as "25" (4+(123−102)).

(S85) The I/O control unit 113 transmits a Locate command to instruct the tape drive 120 to move the magnetic head to the sector of the read start position. Then, the process proceeds to S87.

(S86) The I/O control unit 113 performs a normal movement process. For example, the I/O control unit 113 searches for the data block ID of the read start position for each WRAP and identifies the read start position. After identifying, the I/O control unit 113 instructs the tape drive 120 to move the magnetic head to the read start position.

(S87) The I/O control unit 113 issues a Read command to the tape drive 120. At this time, the I/O control unit 113 instructs the tape drive 120 to perform data reading in which direction. In a case where the WRAP ID identified in S84 is an odd number, the I/O control unit 113 instructs to perform data reading in the forward direction, and in a case where the WRAP ID identified in S84 is an even number, the I/O control unit 113 instructs to perform data reading in the reverse direction. As a result, the tape drive 120 starts reading data from the read start position. Then, the process is ended.

Figure 22:
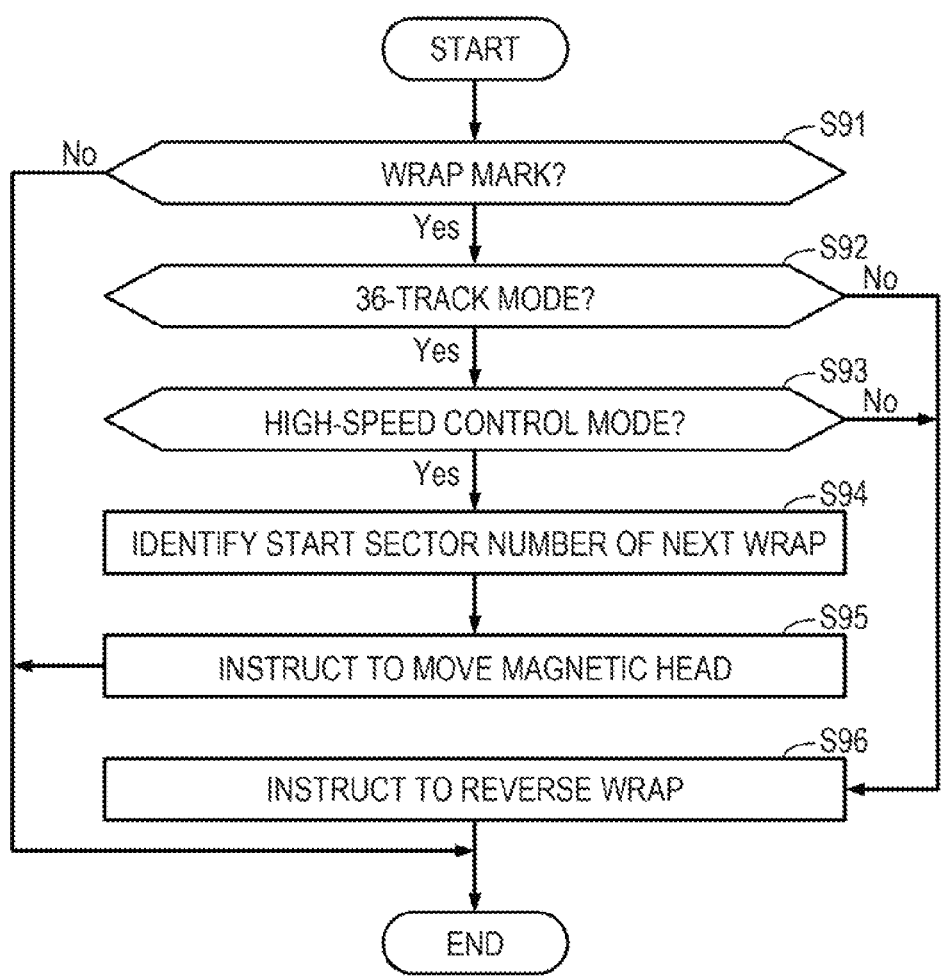
FIG. 22 is a flowchart illustrating an exemplary process after a Read command is issued.

FIG. 22 is a flowchart illustrating an exemplary process after issuing a Read command. Hereinafter, the process illustrated in FIG. 22 will be described.

(S91) The I/O control unit 113 determines whether or not a WRAP mark is detected. In a case where a WRAP mark is detected, the process proceeds to S92. In a case where no WRAP mark is detected, the process is ended.

(S92) The I/O control unit 113 determines whether or not the write mode is the 36-track mode. In the case where the write mode is the 36-track mode, the process proceeds to S93. In the case where the write mode is not the 36-track mode, the process proceeds to S96.

(S93) The I/O control unit 113 determines whether or not the high-speed control flag is "true" by referring to the medium information table 111b. In the case of "true", the process proceeds to S94. In the case of "false", the process proceeds to S96.

(S94) The I/O control unit 113 identifies the start sector number of the next WRAP by referring to the medium information table 111*b*.

(S95) The I/O control unit 113 transmits, to the tape drive 120, a Locate command to move the magnetic head to the identified start sector number in the next WRAP. In addition, the I/O control unit 113 instructs the tape drive 120 to reverse the read direction. Then, the process is ended.

(S96) The I/O control unit 113 instructs the tape drive 120 to perform the WRAP reverse at the WRAP mark. Note that, the information processing according to the first embodiment may be realized by executing a program in a processor used in the tape apparatus 10. The information processing according to the second embodiment may be realized by causing the processor 110*a* to execute a program. Each program may be recorded in a computer-readable recording medium.

For example, it is possible to distribute each program by distributing the recording medium in which each program is recorded. In addition, programs realizing the functions corresponding to the mount control unit 112, the I/O control unit 113, and the monitor unit 114 may be separate programs, and the respective programs may be distributed separately. The functions of the mount control unit 112, the I/O control unit 113, and the monitor unit 114 may be realized by separate computers. The computers may store (install) the program recorded in the recording medium in a storage device such as the RAM 110*b* or the flash memory 110*c*, and read and execute the program from the storage device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A tape apparatus, comprising:
    a tape drive configured to
        perform data reading and data writing on a magnetic tape in which a plurality of tracks are formed; and
    a processor configured to
        control the tape drive to perform data reading and data writing on the plurality of tracks in a first segment among a plurality of segments obtained by dividing the magnetic tape in a running direction,
        reserve a first track of the plurality of tracks as a copy target upon determining that an abnormality occurs in the first segment on the first track, and
        instruct the tape drive to copy data recorded in the first segment on the first track to a second segment on the first track at a predetermined timing, the second segment being one of the plurality of segments and adjacent to the first segment.

2. The tape apparatus according to claim 1, wherein
    the processor is configured to
        determine whether the abnormality occurs in the first segment on the first track on basis of a read retry count or a write retry count for the first segment on the first track, the read retry count being an accumulated number of retries which occur during performing data reading, the write retry count being an accumulated number of retries which occur during performing data writing.

3. The tape apparatus according to claim 1, wherein
    the predetermined timing is a timing at which an unmount instruction is received, the unmount instruction instructing to unmount the magnetic tape from the tape drive.

4. The tape apparatus according to claim 1, wherein
    the processor is configured to
        instruct, after the copy, the tape drive to start appending data in the second segment on the first track,
        instruct the tape drive to reverse a write direction after writing data in the second segment on the first track, the write direction being a forward direction or a reverse direction which is a reverse of the forward direction, and
        instruct the tape drive to write data in the second segment on a second track of the plurality of tracks, the second track being next to the first track.

5. A control device, comprising:
    a memory; and
    a processor coupled to the memory and the processor configured to
        control a tape drive to perform data reading and data writing on a plurality of tracks formed in a magnetic tape in a first segment among a plurality of segments obtained by dividing the magnetic tape in a running direction,
        reserve a first track of the plurality of tracks as a copy target upon determining that an abnormality occurs in the first segment on the first track, and
        instruct the tape drive to copy data recorded in the first segment on the first track to a second segment on the first track at a predetermined timing, the second segment being one of the plurality of segments and adjacent to the first segment.

6. The control device according to claim 5, wherein
    the processor is configured to
        determine whether the abnormality occurs in the first segment on the first track on basis of a read retry count or a write retry count for the first segment on the first track, the read retry count being an accumulated number of retries which occur during performing data reading, the write retry count being an accumulated number of retries which occur during performing data writing.

7. The control device according to claim 5, wherein
    the predetermined timing is a timing at which an unmount instruction is received, the unmount instruction instructing to unmount the magnetic tape from the tape drive.

8. The control device according to claim 5, wherein
    the processor is configured to
        instruct, after the copy, the tape drive to start appending data in the second segment on the first track,
        instruct the tape drive to reverse a write direction after writing data in the second segment on the first track, the write direction being a forward direction or a reverse direction which is a reverse of the forward direction, and
        instruct the tape drive to write data in the second segment on a second track of the plurality of tracks, the second track being next to the first track.

9. A non-transitory computer-readable recording medium having stored therein a program that causes a computer to execute a process, the process comprising:

controlling a tape drive to perform data reading and data writing on a plurality of tracks formed in a magnetic tape in a first segment among a plurality of segments obtained by dividing the magnetic tape in a running direction;

reserving a first track of the plurality of tracks as a copy target upon determining that an abnormality occurs in the first segment on the first track; and instructing the tape drive to copy data recorded in the first segment on the first track to a second segment on the first track at a predetermined timing, the second segment being one of the plurality of segments and adjacent to the first segment.

10. The non-transitory computer-readable recording medium according to claim 9, the process comprising:

determining whether the abnormality occurs in the first segment on the first track on basis of a read retry count or a write retry count for the first segment on the first track, the read retry count being an accumulated number of retries which occur during performing data reading, the write retry count being an accumulated number of retries which occur during performing data writing.

11. The non-transitory computer-readable recording medium according to claim 9, wherein the predetermined timing is a timing at which an unmount instruction is received, the unmount instruction instructing to unmount the magnetic tape from the tape drive.

12. The non-transitory computer-readable recording medium according to claim 9, the process comprising:

instructing, after the copy, the tape drive to start appending data in the second segment on the first track;

instructing the tape drive to reverse a write direction after writing data in the second segment on the first track, the write direction being a forward direction or a reverse direction which is a reverse of the forward direction; and instructing the tape drive to write data in the second segment on a second track of the plurality of tracks, the second track being next to the first track.

* * * * *